(12) United States Patent
Morita et al.

(10) Patent No.: US 6,983,482 B2
(45) Date of Patent: Jan. 3, 2006

(54) DATA BROADCAST CONTENT GENERATION SYSTEM

(75) Inventors: Katsuyuki Morita, Hirakata (JP);
Hideki Kagemoto, Nara (JP);
Hidekazu Shimizu, Hirakata (JP);
Toshihiro Hishida, Kobe (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 1031 days.

(21) Appl. No.: 09/794,188

(22) Filed: Feb. 27, 2001

(65) Prior Publication Data

US 2001/0018766 A1 Aug. 30, 2001

(30) Foreign Application Priority Data

Feb. 29, 2000 (JP) ............................. 2000-053223

(51) Int. Cl.
  H04N 7/025 (2006.01)
  H04N 7/10 (2006.01)
  H04N 5/445 (2006.01)
  G06F 3/00 (2006.01)
  G06F 13/00 (2006.01)

(52) U.S. Cl. .......................... 725/32; 725/40; 725/114; 709/203; 709/219

(58) Field of Classification Search ................. 725/32, 725/37, 40, 42, 60, 112, 114, 138, 144; 707/201; 709/203, 219; 715/513
See application file for complete search history.

(56) References Cited

U.S. PATENT DOCUMENTS

| 5,848,427 A | * | 12/1998 | Hyodo ........................ 715/513 |
| 5,999,912 A | * | 12/1999 | Wodarz et al. ................ 705/14 |
| 6,459,427 B1 | * | 10/2002 | Mao et al. ................... 725/109 |
| 6,675,385 B1 | * | 1/2004 | Wang ............................ 725/39 |

FOREIGN PATENT DOCUMENTS

GB 2 325 776 12/1998

* cited by examiner

*Primary Examiner*—Vivek Srivastava
*Assistant Examiner*—Joseph Ustaris

(57) ABSTRACT

A data broadcast content generation system stores body data for displaying a body page, a plurality of sets of part data each being composed of display element data for determining a display element and attached data for displaying an attached page, and schedule information which associates each broadcast data slot with a set of part data. For each broadcast time slot, the body data, display element data of the set of part data, and attached data of the set of part data are related to each other, so that a display element determined by the display element data will be displayed in the body page and a link destination of the display element will be an attached page displayed using the attached data. The body data, the display element data, and the attached data are then set as carousel data to be transmitted during the broadcast time slot.

14 Claims, 15 Drawing Sheets

FIG. 6

```
2010
<BML>
<BODY>
<H1> WEATHER INFORMATION </H1>

<A HREF="CENTER/CENTER.bml"> Central Region </A>

<IMG SRC="MAP.jpg">
. . . . . . . . . .
<A HREF="CM1/CM1.bml"> <IMG SRC="CM1.jpg"> </A>
</BODY>
</BML>
```

FIG. 7

| MODULE NAME | CONTAINED FILENAME |
|---|---|
| STARTUP | STARTUP.bml<br>MAP.jpg<br>CM1.jpg |
| CENTER | CENTER.bml<br>MAP1.jpg |
| WEST | WEST.bml<br>MAP2.jpg |
| EAST | EAST.bml<br>MAP3.jpg |
| SOUTH | SOUTH.bml<br>MAP4.jpg |

FIG. 9

| MODULE NAME | CONTAINED FILENAME |
|---|---|
| A | A.bml |
| | AS1.jpg |
| | AS2.jpg |
| | A1.bml |
| | A1.png |
| | A11.bml |
| | A12.bml |

| BROADCAST TIME SLOT | PART ID |
|---|---|
| 9:00−9:10 | A |
| 9:10−9:30 | B |
| 9:30−9:45 | XBANK |

DATA BROADCAST CONTENT GENERATION SYSTEM

BACKGROUND OF THE INVENTION

1. Field of the Invention

The present invention relates to the generation of content for data broadcasting, and in particular relates to the generation of content that includes an image containing a banner advertisement which changes with broadcast time.

2. Related Art

In recent years, digital-broadcasting is performed to deliver digitally-compressed video, voice, and data via transmission means such as satellite or CATV.

Also, so-called data broadcasting is employed nowadays in Japan, to transmit content made up of mutually-linked sets of image data to a viewer (i.e. a user of a broadcast receiving device which receives the content and displays images on a display screen), so that the user can view desired images on the screen in an interactive manner. The standardization of data broadcast technologies is being promoted by ARIB (Association of Radio Industries and Businesses) and others in Japan.

Content of a data broadcast is a group of frames (hereinafter, "page frames") which are each formed based on a set of image data to be displayed in one frame. In a given broadcast time period, the content is made up of a plurality of sets of image data, such as Web pages, which are to be displayed on the screen. A broadcast transmitting device repeatedly transmits such a plurality of sets of image data during the time period, so that the broadcast receiving device can receive them anytime during the time period and display images on the screen.

The plurality of sets of image data that form the content include data of character strings and images to be displayed on the screen, text code data written in some kind of markup language, and the like. The markup language is a language used for determining how to display data on the screen.

An example of data broadcast content is a weather information program that broadcasts information about the regional weather conditions, 24 hours every day. When the broadcast receiving device receives this weather information program, first a page frame that contains one or more buttons is displayed on the screen. When the user selects (presses) one of the buttons, a page frame corresponding to the selected button is displayed.

FIG. 1 shows an example of the top page frame of the weather information program which is displayed first on the screen.

The broadcast receiving device receives a plurality of sets of image data of the broadcasted weather information program, and displays a page frame 9100 shown in FIG. 1 on the screen. The page frame 9100 includes a button 9101.

The button 9101 displays a so-called banner advertisement of a sponsor which supports the weather information program. This button 9101 serves as an entry to shift to a page frame that provides detailed information of a product or service being advertized. In this specification, a relation between two page frames which effects such a shift is referred to as "link", such that "link destination" of the button displaying the banner ad is the page frame of the detailed information of the ad. Note here that the link destination of the banner ad button can translate to the link destination of the display contents of the banner ad button.

This being so, when the user presses the button 9101 using, for example, a remote control device for controlling the broadcast receiving device, a page frame 9200 shown in FIG. 2 is displayed on the screen.

The page frame 9200 is a page frame showing the ad which is attached to the weather information program.

This page frame 9200 includes buttons 9201 and 9202. When the user presses one of these buttons, a page frame showing another information relating to the ad is displayed on the screen.

There may be cases where page frames that make up content change with broadcast time, i.e. the contents of the page frames differ from one broadcast time slot to another within the broadcast time of the content. To broadcast such content made up of the page frames which differ from one broadcast time slot to another, it is necessary to change the contents of data which is repeatedly transmitted, for each broadcast time slot. The data which is repeatedly transmitted during one broadcast time slot is "carousel data" (hereafter simply referred to as "carousel").

A procedure of generating the content of the above weather information program and transmitting it by a broadcast station or the like is explained below, focusing on an authoring device for aiding the creation of the content and a broadcast content generating device for organizing the created content in a format for data transmission. The authoring device and the broadcast content generating device are conceivable devices for the generation and transmission of content.

(1) The authoring device creates, for a carousel corresponding to each broadcast time slot, text code data written in the markup language to define each page frame, and monomedia data such as image data that is the material for displaying each page frame, as files. The authoring device also creates structure information files that hold structure information showing which files should be contained in each module. Hereinafter, a file of text code data in the markup language is referred to as "BML document file", and a file of monomedia data as "material file".

A module is a logical data unit of transmission/reception when the broadcast transmitting device transmits a data broadcast or the broadcast receiving device receives a data broadcast. Modules are components of a carousel. One module can contain the contents of more than one file if the file size is no greater than a predetermined size such as 1 MB.

A structure of a page frame is defined by a BML document file, which describes a link to another page frame using a filename of a BML document file of the other page frame as a link destination address. Here, if the BML document file of the link destination page frame belongs to a module different with the BML document file of the link source page frame, the link destination address is expressed by adding a module name of the module to which the BML document file of the link destination page frame belongs, to the filename of the BML document file.

(2) The broadcast content generating device receives the BML document files, material files, and structure information files created by the authoring device. In accordance with the structure information in the structure information files, the broadcast content generating device specifies which BML document files and material files should be contained in each module, and organizes the files which compose each module in multipart form. Here, to organize files of a module in multipart form means to integrate the contents of the files and add information such as addresses so as to enable access to the contents of each file within the module, thereby integrating the contents of the files into a single file.

(3) The broadcast content generating device outputs the multipart data of each module of the carousel corresponding to each broadcast time slot, to a data broadcast transmission system.

The data broadcast transmission system encodes the data of each module of the carousel corresponding to each broadcast time slot, in other words converts the data of the plurality of modules that compose the carousel, into a transport stream. The transport stream mentioned here is based on the MPEG2 (Moving Picture Experts Group 2) standards, and is explained in detail in the ISO/IEC Standard 13818-1 (MPEG2 System) specifications.

Such a transport stream generated for each broadcast time slot is then repeatedly transmitted by a broadcast transmitting device in the data broadcast transmission system, during the corresponding broadcast time slot.

Here, it may be necessary to generate such content in which a page frame, like the page frame shown in FIG. 1, contains a banner ad of a sponsor which changes with broadcast time. For example, consider the case where, in a weather information program which provides the same weather information for three hours, a sponsor of the weather information program changes in each broadcast time slot that is several minutes or several tens of minutes long, and so a different banner ad needs to be displayed in each broadcast time slot depending on which sponsor supports the program during the broadcast time slot.

Since the weather information program is supported by different sponsors in different broadcast time slots, the banner ad provides links to different page frames at the different broadcast time slots. Therefore, the broadcast transmitting device needs to change a carousel to be repeatedly transmitted, for each broadcast time slot.

When the broadcast receiving device receives such content, the top page frame of the weather information program is displayed as shown in FIG. 1, in which only the contents of the banner ad change with time. As the contents of the banner ad change, a page frame which will be displayed when the user presses the banner ad button also changes.

Like when the sponsor of the program frequently changes in a short time, if the banner ad and the group of page frames linked from the banner ad change while the body of the content itself is unchanged, the broadcast station has to transmit a different carousel whenever the banner ad changes.

To do so, a content creator must appropriately define links among all sets of image data that form each carousel prior to the transmission, through the use of the authoring device or the like. The content creator often finds such a work burdensome.

Suppose the banner ad displayed in the top page frame of the weather information program is an ad of a product of a company A that is a sponsor of the program in one broadcast time slot, and an ad of a product of a company B that is another sponsor of the program in the next broadcast time slot.

In this case, a filename of a BML document file which is used as a link destination address of the banner ad button is arbitrarily determined by each of the company A and the company B. Accordingly, a filename of a BML document file which defines a page frame showing detailed information of the product of the company A is likely to be different with a filename of a BML document file which defines a page frame showing detailed information of the product of the company B. In other words, when two files are created by different sponsors, the filenames of the two files will usually end up being different, or they may be made different intentionally for, for example, the purposes of file management. Also, a filename of a material file which holds image data of the banner ad itself is usually different from one sponsor to another. Further, a filename of a material file referenced by the BML document file defining the page frame of the detailed information of the ad may be different from one sponsor to another, as well as the number of material files referenced by such a BML document file.

Thus, when there are different filenames for the BML document file which defines the link destination page frame of the banner ad or there are different filenames for the material file of the image data of the banner ad itself, the content creator has to change the contents of the BML document file which defines the top page frame of the weather information program and appropriately relate all files that form the content, for each carousel.

SUMMARY OF THE INVENTION

In view of the above problem, the present invention aims to provide a data broadcast content generation system that can lighten the workload for generating such content in which a banner ad that is attached to a page frame of the body of the content changes with broadcast time.

The above object can be fulfilled by a data broadcast content generation system for generating content that includes a body page and an attached page, including: a body data storing unit for storing body page data for displaying the body page; a part data storing unit for storing a plurality of sets of part data which are each a combination of display element data for determining a display element and attached page data for displaying an attached page; a schedule storing unit for storing broadcast schedule information that associates each of a plurality of broadcast time slots with information for identifying a set of part data; and a combining unit, for each of the plurality of broadcast time slots, for (a) specifying a set of part data associated with the broadcast time slot, in accordance with the broadcast schedule information, (b) relating the body page data, display element data of the specified set of part data, and attached page data of the specified set of part data to each other, so that a display element determined by the display element data will be displayed in the body page, and a link destination of the displayed display element will be an attached page displayed using the attached page data, the attached page being referred to as a link destination attached page, and (c) setting the body page data, the display element data, and the attached page data which are related to each other, as carousel data to be transmitted during the broadcast time slot.

With this construction, the generation of the content becomes easy, when the display element (e.g. a banner ad) is attached to the body page (e.g. a page frame of content body), and the display element and its link destination change with broadcast time. Which is to say, for each broadcast time slot, the body page data for displaying the body page, the display element data for displaying the display element, and the attached page data for displaying the link destination attached page (e.g. detailed information of a product or service being advertised) are automatically related to each other, so that the content creator can generate the content only by creating the body page data and the plurality of sets of part data (e.g. for different sponsors) separately and specifying the broadcast schedule information. This also makes it easy to reuse the plurality of sets of part data.

Here, the attached page data of each of the plurality of sets of part data may include part document data which is written in a markup language to define the attached page, wherein a part document file which holds the part document data is stored in the part data storing unit together with a display element file which holds the display element data of each of the plurality of sets of part data, the body page data includes body document data which is written in the markup language to define the body page, the body document data including a first filename and a second filename, the first filename being written as a filename for identifying a display element file that determines the display element which will be displayed in the body page and linked to the link destination attached page, and the second filename being written as a filename for identifying a part document file that defines the link destination attached page, and the combining unit relates the body page data, the display element data, and the attached page data to each other, by changing a filename of a display element file holding the display element data, to the first filename, and changing a filename of a part document file holding part document data included in the attached page data, to the second filename.

With this construction, when the file which determines the display contents of the display element and the file which defines the link destination attached page have arbitrary filenames, the data broadcast content generation system changes their filenames to establish the appropriate link relation with the body page data. Accordingly, even when the plurality of sets of part data are generated to be broadcasted in different broadcast time slots, files which compose each set of part data are assigned such filenames that make it easy to identify each file. Hence the management of the files becomes easy.

Here, the carousel data may be made up of a plurality of modules which should each be generated so as to contain at least one file, wherein the body document data shows the relation between the body page data, the display element data, and the attached page data, using the second filename for identifying the part document file which defines the link destination attached page, and module identification information for identifying a module that is to contain the part document file, the data broadcast content generation system further includes a structure information storing unit for storing structure information that shows which file or files are to be contained in each of the plurality of modules, and the combining unit (1) determines which file or files, out of a plurality of files that hold the related body page data, display element data, and attached page data, are to be contained in each of the plurality of modules, in accordance with the structure information, (2) assigns a unique module identifier to each of the plurality of modules, and (3) changes the module identification information written in the body document data, to a module identifier assigned to the module that is to contain the part document file which defines the link destination attached page.

With this construction, when the module identifier of the module that contains the file defining the link destination attached page, where the module is the logical unit of transmission/reception in data broadcasting, is used as the link destination address in the file defining the body page, the appropriate link relation to the link destination attached page is established. This is suitable when the body page data and the set of part data are contained in different modules. This enables only the modules relating to the set of part data, to be updated in each broadcast time slot. All the broadcast receiving device has to do is to receive the updated modules in each broadcast time slot, with it being possible to improve the overall processing speed.

Here, the content may include a plurality of body pages which are mutually linked and a plurality of attached pages which are mutually linked, wherein the combining unit relates the body page data, the display element data, and the attached page data to each other, so that the display element determined by the display element data will be displayed in one of the plurality of body pages, and the link destination of the displayed display element will be one of the plurality of attached pages.

With this construction, the content body is made up of a plurality of body pages which are mutually linked, and the display element attached to one of the plurality of body pages provides a link to one of a plurality of attached pages which are mutually linked. As a result, the generation of the content in which data other than the content body changes with broadcast time becomes easy.

Here, the information for identifying the set of part data in the broadcast schedule information may be a part identification name expressed by a character string, wherein the display element file that holds the display element data of each of the plurality of sets of part data in the part data storing unit has a filename obtained by adding a first predetermined character string to a part identification name of the set of part data, and the part document file that holds the part document data of each of the plurality of sets of part data has a filename obtained by adding a second predetermined character string to a part identification name of the set of part data, and the combining unit relates the body page data, the display element data, and the attached page data to each other, by changing a filename of a display element file whose filename is obtained by adding the first predetermined character string to a part identification name of the specified set of part data, to the first filename, and changing a filename of a part document file whose filename is obtained by adding the second predetermined character string to the part identification name of the specified set of part data, to the second filename.

With this construction, a part identification name is included in the broadcast schedule information for each broadcast time slot. Also, the combination of the part identification name and a specific character string such a ".jpg" is set as the filename of the file determining the display contents of the display element, and the combination of the part identification name and a specific character string such as "bml" is set as the filename of the file defining the link destination attached page. As a result, it becomes easy to generate the content in which the display element attached to the body page and the link destination of the display element change with broadcast time.

Here, the attached page data of each of the plurality of sets of part data may include part document data which is written in a markup language to define the attached page, wherein a multipart file obtained by multipart-converting a group of files that hold the attached page data and include a part document file holding the part document data is stored in the part data storing unit together with a display element file which holds the display element data of each of the plurality of sets of part data, the body page data includes body document data which is written in the markup language to define the body page, the body document data including a first filename and a second filename, the first filename being written as a filename for identifying a display element file that determines the display element which will be displayed in the body page and linked to the link destination attached page, and the second filename being written as a filename for identifying a part document file that defines the link destination attached page, and the combining unit relates the body page data, the display element data, and the attached page data to each other, by changing a filename of a display element file holding the display element data, to the first filename.

With this construction, data other than the content body, i.e. the contents of the files necessary to display the link destination attached page which changes with broadcast time, are multipart-converted into a single file. This makes it easy to manage each module which changes with broadcast time.

Here, the data broadcast content generation system may further include a data generating unit for generating the body page data and the attached page data of each of the plurality of sets of part data, wherein the body data storing unit stores the body page data generated by the data generating unit, and the part data storing unit stores the attached page data of each of the plurality of sets of part data generated by the data generating unit.

With this construction, the content creator can have the data broadcast content generation system create the body page data for displaying the body page and the attached page data for displaying the attached page, to generate the content.

Here, the display element determined by the display element data of each of the plurality of sets of part data may be a banner, wherein the body page data includes body document data that is written in a markup language to define the body page, the attached page data of each of the plurality of sets of part data includes part document data which is written in the markup language to define the attached page, and a part document file which holds the part document data is stored in the part data storing unit together with a display element file which holds the display element data of each of the plurality of sets of part data, the data generating unit, when instructed by a user to add a banner to the body page, adds such a description to the body document data that indicates to display the banner in the body page and includes a first filename and a second filename, the first filename being written as a filename for identifying a display element file which determines the banner, the second filename being written as a filename for identifying a part document file which defines a link destination attached page of the banner, and the combining unit relates the body page data, the display element data, and the attached page data to each other, by changing a filename of a display element file holding the display element data, to the first filename, and changing a filename of a part document file holding part document data included in the attached page data, to the second filename.

With this construction, when instructed by the content creator to attach a banner ad to the body page, the data broadcast content generation system adds a statement such as <A HREF="CM1/CM1.bml"><IMG SRC="CM1.jpg"></A> to the file which defines the body page. Thus, the content creator can attach the banner ad to the body page easily.

The above object can also be fulfilled by a data broadcast content generation system for generating content that includes a body page and an attached page, including: a body data storing unit for storing body page data for displaying the body page; a part data storing unit for storing a plurality of sets of part data which are each a combination of a set of display element data for determining a display element and a set of attached page data for displaying an attached page; a schedule storing unit for storing broadcast schedule information that associates each of a plurality of broadcast time slots with n sets of information for identifying n sets of part data, n being an integer no smaller than 2; and a combining unit, for each of the plurality of broadcast time slots, for (a) specifying n sets of part data associated with the broadcast time slot, in accordance with the broadcast schedule information, (b) relating the body page data, n sets of display element data of the specified n sets of part data, and n sets of attached page data of the specified n sets of part data to each other, so that n display elements determined by the n sets of display element data will be displayed in the body page, and n link destinations of the displayed n display elements will be n attached pages displayed using the n sets of attached page data, the n attached pages hereinafter being called n link destination attached pages, and (c) setting the body page data, the n sets of display element data, and the n sets of attached page data which are related to each other, as carousel data to be transmitted during the broadcast time slot.

With this construction, the generation of the content becomes easy, when two or more display elements are added to the body page, and the display elements and their link destinations change with broadcast time.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 6 shows an example of the contents of a BML document file 2010 shown in FIG. 5;

FIG. 7 shows an example of the contents and structure of structure information held in a structure information file 2090 shown in FIG. 5;

FIG. 9 shows an example of the contents and structure of structure information held in a structure information file 3090 shown in FIG. 8;

FIG. 11 shows an example of the contents and structure of schedule information;

DESCRIPTION OF THE PREFERRED EMBODIMENT(S)

The following is a description of a content generation system according to an embodiment of the present invention, with reference to the drawings.

1. Construction

Figure 3:
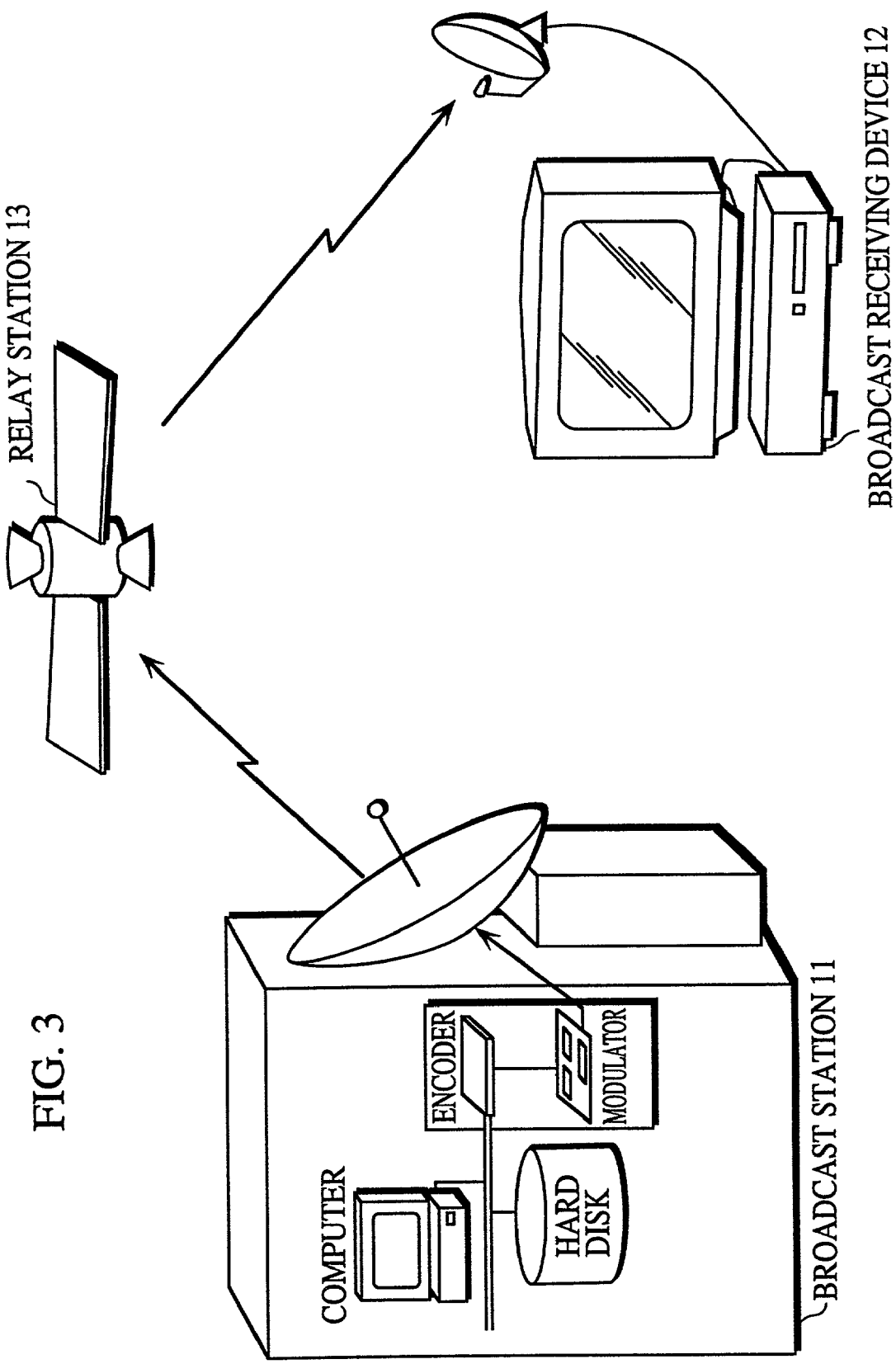
FIG. 3 shows a general outline of a data broadcast system according to an embodiment of the invention.

FIG. 3 shows a general outline of a data broadcast system to which the embodiment of the invention relates.

As illustrated, the data broadcast system is roughly made up of a broadcast station 11 for transmitting a data broadcast and a broadcast receiving device 12 for receiving the data broadcast.

In the broadcast station 11, content of the data broadcast is generated by a content generation system equipped with a computer and a hard disk, and transmitted by a data broadcast transmission system equipped with an encoder and a modulator, via a broadcast antenna. The content is relayed by a relay station 13 such as satellite, and received and utilized by the broadcast receiving device 12 installed in each house.

Figure 4:
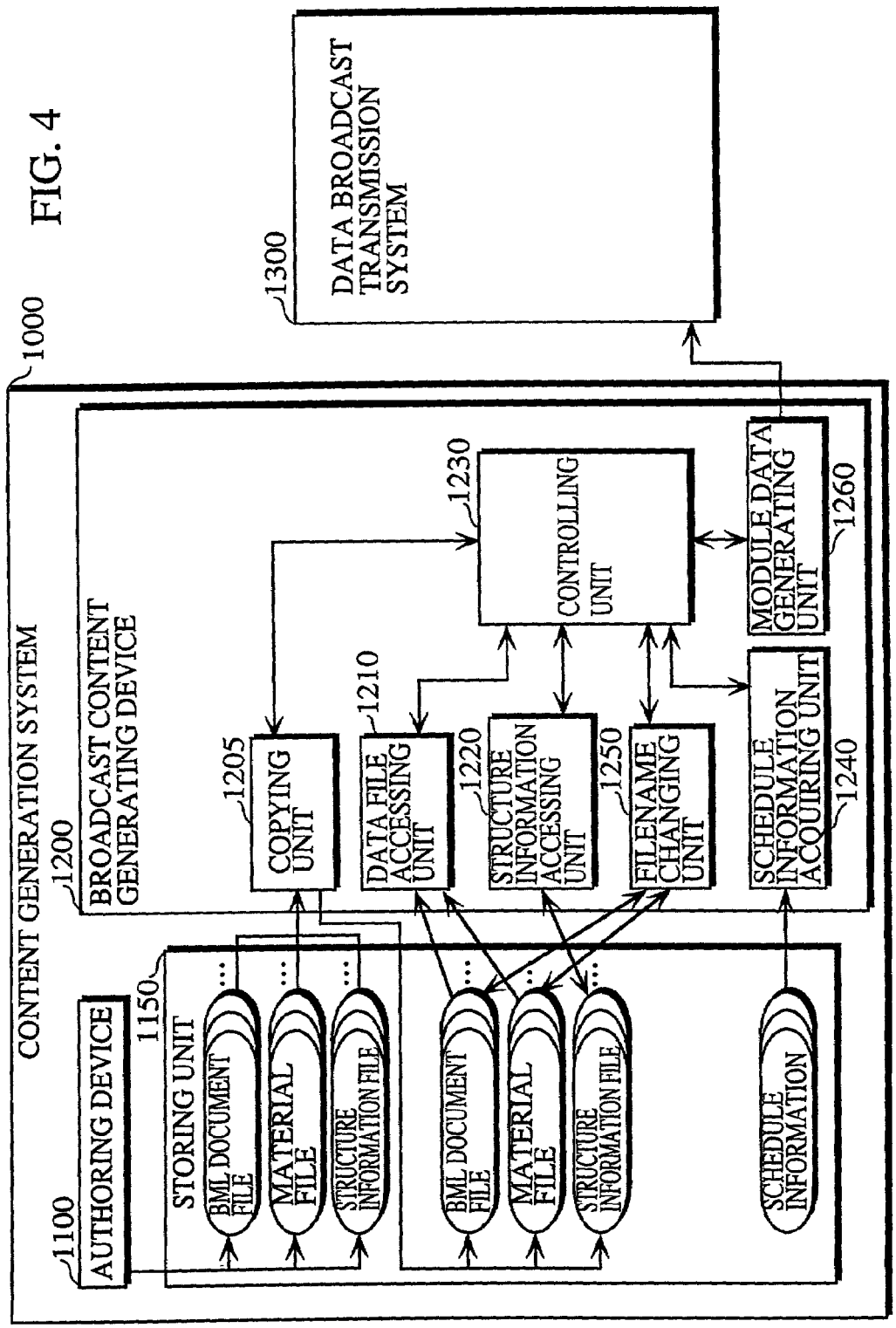
FIG. 4 is a block diagram of a content generation system according to the embodiment of the invention.

FIG. 4 is a block diagram of the content generation system according to the embodiment of the invention. The drawing also shows the data broadcast transmission system 1300 that receives data of modules generated by the content generation system, generates a transport stream from the received data, and transmits it.

The content generation system 1000 shown in the drawing is physically provided with a computer including a CPU, a memory, a keyboard, a display, and a hard disk device, and functionally provided with an authoring device 1100, a storing unit 1150, and a broadcast content generating device 1200. The functions of the authoring device 1100 and broadcast content generating device 1200 are realized by the CPU executing control programs stored in the memory.

The authoring device 1100 aids the creation of the content of the data broadcast. The authoring device 1100 has the main functions of aiding (1) the generation of BML document files that define the display modes of page frames which constitute the content, (2) the generation of material files that hold monomedia data for displaying the page frames, and (3) the decision as to which files are to be contained in each module that is the logical data unit of the transmission/reception of the content.

To create a group of modules by the content creator, the authoring device 1100 basically generates one or more BML document files, one or more material files, and a structure information file holding structure information specifying the contents of each module. These files are then stored in the storing unit 1150. Here, the material files are not necessarily generated by the authoring device 1100. Also, the BML document files are files which each describe information relating to the display contents of a page frame, in a markup language.

The storing unit 1150 is provided with a hard disk device and a memory, and has areas for storing the BML document files, the material files, the structure information files, and schedule information.

The broadcast content generating device 1200 generates, for each of carousels to be broadcasted in different broadcast time slots, data of modules that form the carousel, based on the various files generated by the authoring device 1100 and stored in the storing unit 1150, and the schedule information inputted by the content creator and stored in the storing unit 1150. The broadcast content generating device 1200 then outputs the generated data to the data broadcast transmission system 1300. The broadcast content generating device 1200 includes a copying unit 1205, a data file accessing unit 1210, a structure information accessing unit 1220, a controlling unit 1230, a schedule information acquiring unit 1240, a filename changing unit 1250, and a module data generating unit 1260.

The copying unit 1205 copies each of the files which are generated by the authoring device 1100 and stored in the storing unit 1150.

The data file accessing unit 1210 accesses BML document files and material files produced as a result of the copy by the copying unit 1205, and reads/writes the contents of the files, under the control of the controlling unit 1230.

The structure information accessing unit 1220 accesses structure information files produced as a result of the copy by the copying unit 1205, and reads/writes structure information in the structure information files, under the control of the controlling unit 1230.

The controlling unit 1230 exercises control over the copying unit 1205, the data file accessing unit 1210, the structure information accessing unit 1220, the schedule information acquiring unit 1240, the filename changing unit 1250, and the module data generating unit 1260, to generate the data broadcast content. This control is primarily intended to determine, for each broadcast time slot, the contents of each of modules that form the carousel to be transmitted in the broadcast time slot in accordance with the schedule information, and output a file corresponding to each of the modules to the data broadcast transmission system 1300 together with information showing the broadcast time slot.

The schedule information acquiring unit 1240 acquires the schedule information stored in the storing unit 1150, under the control of the controlling unit 1230.

The filename changing unit 1250 copies a BML document file or material file specified by the controlling unit 1230, and generates a file with a filename designated by the controlling unit 1230.

The module data generating unit 1260 generates, for each of the modules of the carousel, a file that integrates data of all files contained in the module, and outputs the generated file to the data broadcast transmission system 1300.

The data broadcast transmission system 1300 receives the information showing the broadcast time slot, and the files corresponding to the modules that make up the carousel to be transmitted during the broadcast time slot. The data broadcast transmission system 1300 encodes the contents of the files corresponding to the modules, and generates a transport stream so as to repeat the contents of the files. The data broadcast transmission system 1300 then modulates the transport stream, and repeatedly transmits it during the broadcast time slot.

2. Data

Figure 1:
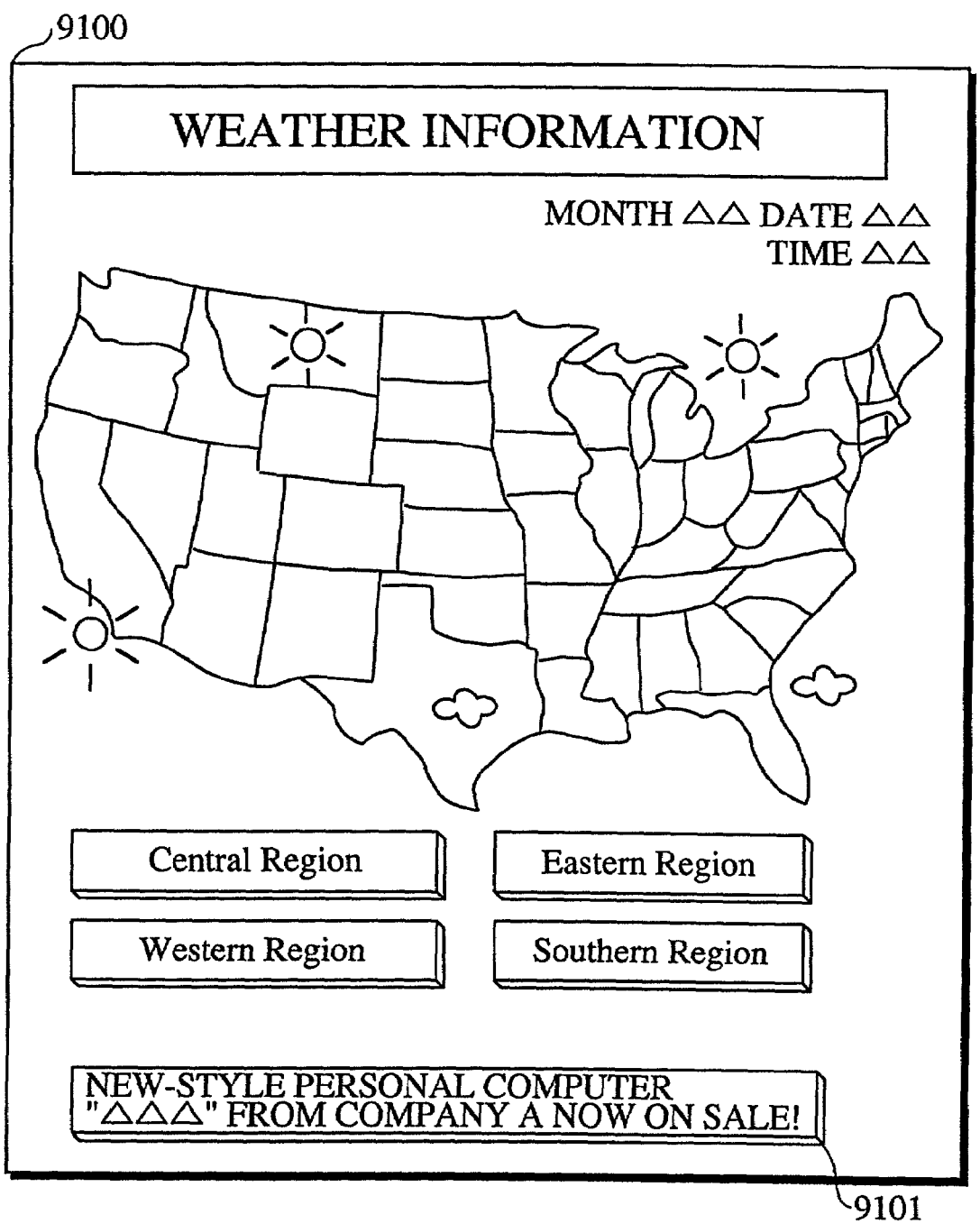
FIG. 1 shows a top page frame of a weather information program.

The following is an explanation on various types of files generated by the authoring device 1100 and stored in the storing unit 1150, taking the weather information program shown in FIG. 1 as an example. In the following explanation, data for displaying a banner ad attached to the weather information program and data for displaying a group of page frames linked from the banner ad are collectively called "part data", whereas data for displaying a group of page frames in the weather information program other than the part data is called "body data". The body data is not an attachment such as an ad, but is data that relates to the body of the content.

The content creator generates the body data using the authoring device 1100, and generates the part data separately from the body data.

2.1. Body Data

The following is an explanation of files generated by the authoring device 1100 and stored in the storing unit 1150, when the content creator creates the body data of the weather information program.

Figure 5:
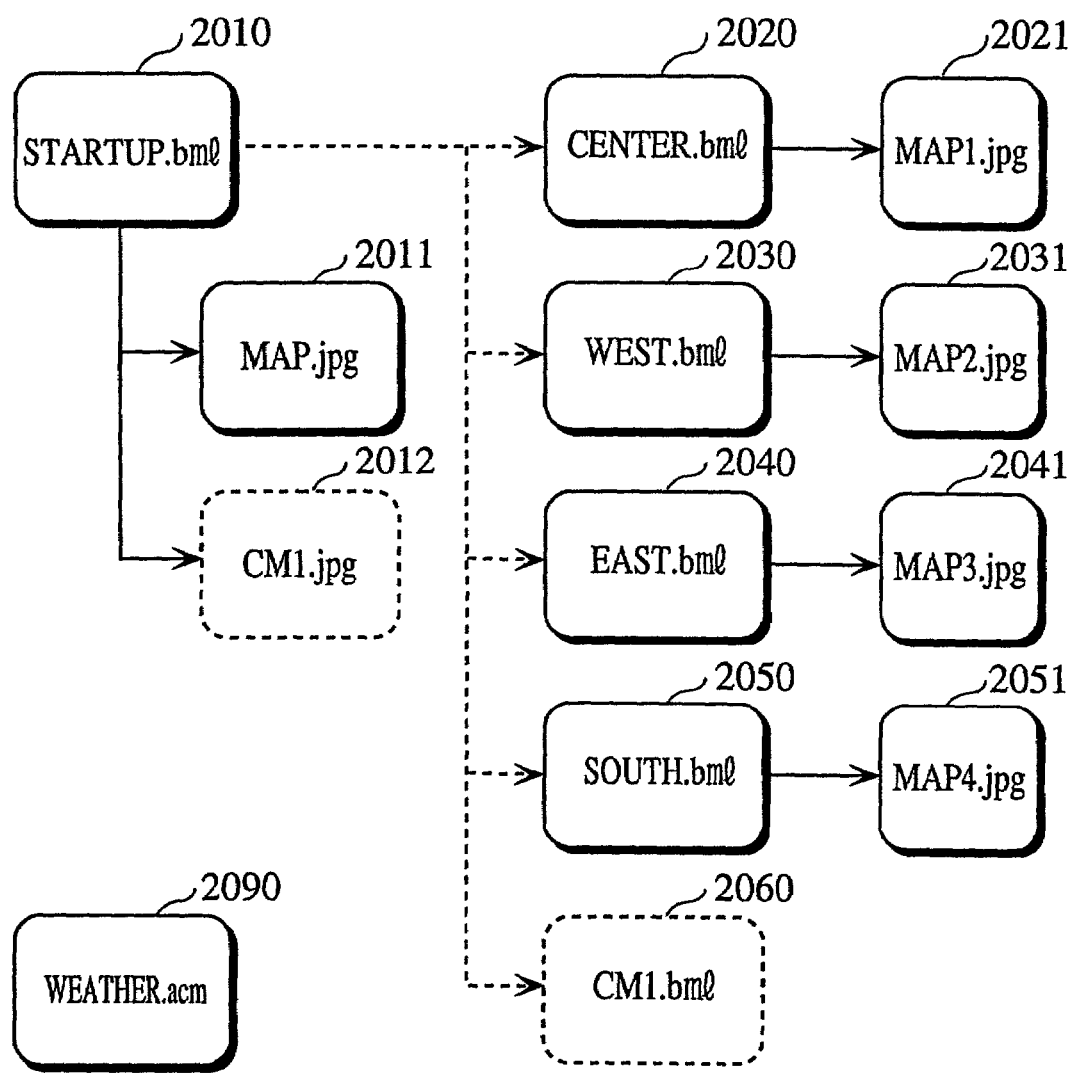
FIG. 5 shows an example of a group of files generated as body data of the weather information program.

FIG. 5 shows an example of a group of files generated as the body data of the weather information program.

In the drawing, files whose filenames are boxed in solid lines are files which are generated by the authoring device 1100 in the body data generation process, while files whose filenames are boxed in dashed lines, namely a material file 2012 with a filename "CM1.jpg" and a BML document file 2060 with a filename "CM1.bml", are files which are not generated by the authoring device 1100 in the body data generation process (i.e. which do not belong to the body data of the weather information program).

Files with extensions ".bml" are BML document files, whereas files with extensions ".jpg" are material files holding JPEG (Joint Photographic Experts Group) image data. Also, files with extensions ".acm" are structure information files described above.

In FIG. 5, each file indicated by a solid arrow from a BML document file is a file corresponding to part of the display contents of a page frame defined by the BML document file. Meanwhile, each file indicated by a dashed arrow from a BML document file is a file which defines a page frame that is a link destination of a page frame defined by the BML document file.

A BML document file 2010 with a filename "STARTUP.bml" is a file that defines the page frame shown in FIG. 1. BML document files 2020, 2030, 2040, 2050, and 2060 are files that define link destination page frames of the page frame defined by the BML document file 2010. In other words, when the user presses one of the buttons "Central Region", "Western Region", "Eastern Region", and "Southern Region" or the banner ad button 9101 in the page frame in FIG. 1 using the remote control or the like, a page frame defined by one of the five BML document files which corresponds to the selected button is displayed on the screen.

Note here that this embodiment is based on the premise that a page frame which is first displayed when the broadcast receiving device 12 receives content is always defined by a BML document file which is identified by a fixed filename "STARTUP.bml" and is contained in a module with a module ID FIG. 6 shows an example of the contents of the BML document file 2010 shown in FIG. 5.

This BML document file 2010 defines the page frame shown in FIG. 1, in a kind of markup language similar to HTML (Hypertext Markup Language) that is a description language for Web pages. The language used here is just one example, and should not be a limit for the invention. Also, though the language is different from a language actually used when writing general BML documents, the BML document file 2010 may instead be written in the language actually used for BML documents.

In FIG. 6, a description such as "CENTER/CENTER.bml" or "CM1/CM1.bml" indicates the location of a BML document file which defines a link destination page frame, by showing a module name and a BML document filename respectively before and after the slash mark "/".

According to the BML document file 2010 in FIG. 6, when the user presses the "Central Region" button in FIG. 1, a page frame defined by a BML document file with a filename "CENTER.bml" in a module with a module name "CENTER" is displayed on the screen. Also, when the user presses the banner ad button 9101 displayed from a material file with a filename "CM1.jpg", a page frame defined by a BML document file with a filename "CM1.bml" in a module with a module name "CM1" is displayed on the screen.

In this embodiment, the content creator generates the BML document file which defines the page frame including the banner ad in the body data generation process, always based on the premise that the display contents of the banner ad are shown by a material file which is identified by a fixed filename "CM1.jpg", and the link destination page frame of the banner ad is defined by a BML document file which is identified by a fixed filename "CM1.bml and contained in a module with a fixed module name "CM1". Which is to say, the content creator creates files such as the BML document file 2010 and a structure information file 2090 shown in FIG. 5, with consideration given to the fact that the broadcast content generating device 1200 will automatically generate files such as "CM1.jpg" and "CM1.bml", as described later.

FIG. 7 shows an example of the contents and structure of structure information 2100 held in the structure information file 2090 with a filename "WEATHER.acm" shown in FIG. 5.

The structure information 2100 has a module name filed 2101 and a contained filename field 2102, and lists filenames of files such as BML document files whose contents are to be contained in a module identified by each module name given in the module name field 2101.

According to this structure information 2100, a module with a module name "STARTUP" is to contain the contents of three files with filenames "STARTUP.bml", "MAP.jpg", and "CM1.jpg". A module with a module name "CENTER" is to contain the contents of two files with filenames "CENTER.bml" and "MAP1.jpg". A module with a module name "WEST" is to contain the contents of two files with filenames "WEST.bml" and "MAP2.jpg". A module with a module name "EAST" is to contain the contents of two files with filenames "EAST.bml" and "MAP3.jpg". A module with a module name "SOUTH" is to contain the contents of two files with filenames "SOUTH.bml" and "MAP4.jpg".

In this embodiment, the content creator determines a module structure in the body data generation process, on the premise that the contents of the material file with the fixed filename "CM1.jpg" showing the display contents of the banner ad should be contained in the same module as the contents of the BML document file with the fixed filename "STARTUP.bml".

2.2. Part Data

The following is an explanation of files generated by the authoring device 1100 and stored in the storing unit 1150, when the content creator creates part data for the ad attached to the weather information program by the company A which is a sponsor of the weather information program.

Figure 8:
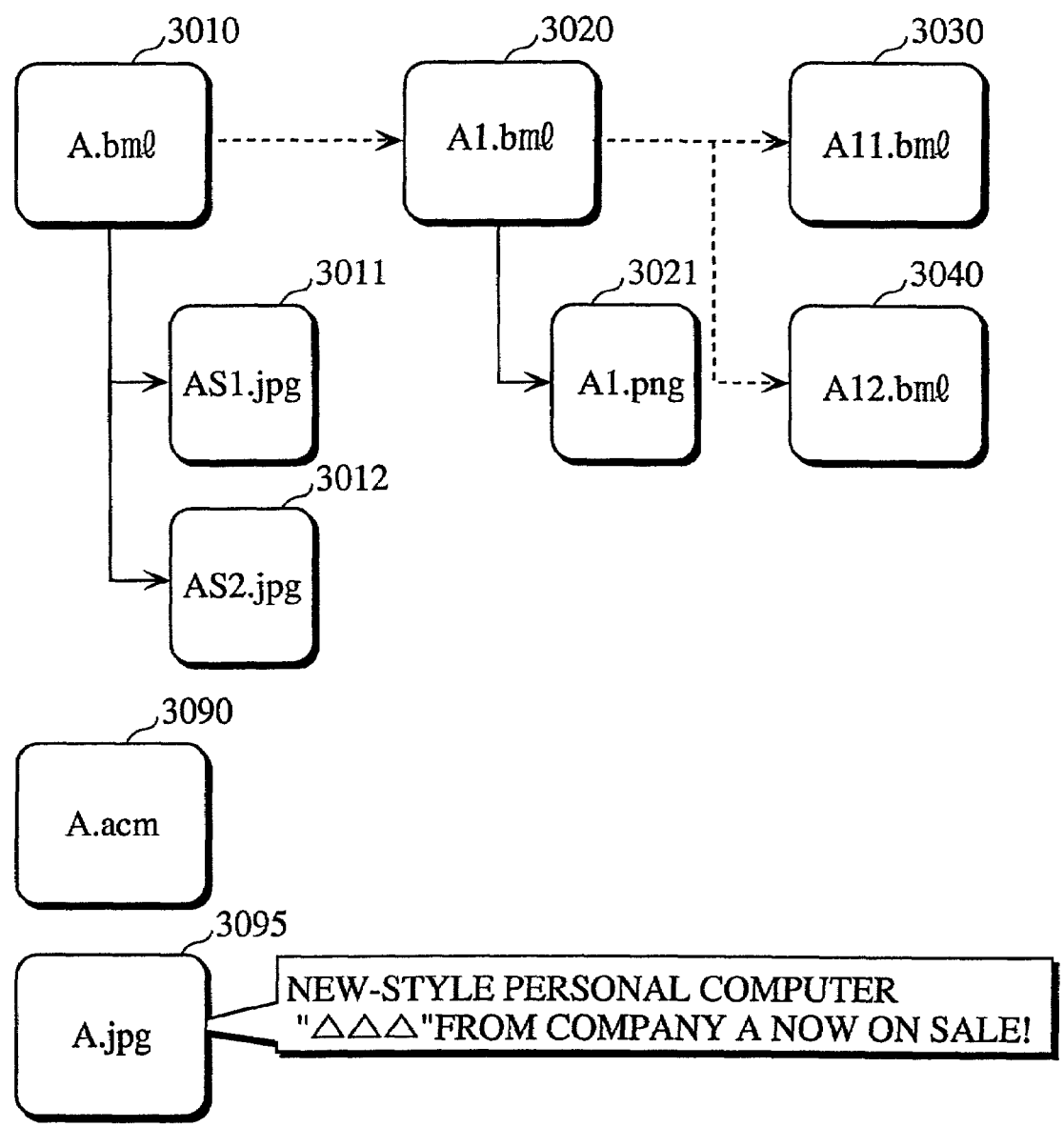
FIG. 8 shows an example of a group of files generated as part data of an ad of a company A to be attached to the weather information program.

FIG. 8 shows an example of a group of files generated as the part data of the ad of the company A which is attached to the weather information program.

Here, files with extensions ".png" are material files which hold PNG (Portable Network Graphic) image data.

Also, the representations of solid arrows and dashed arrows are the same as those in FIG. 5.

Figure 2:
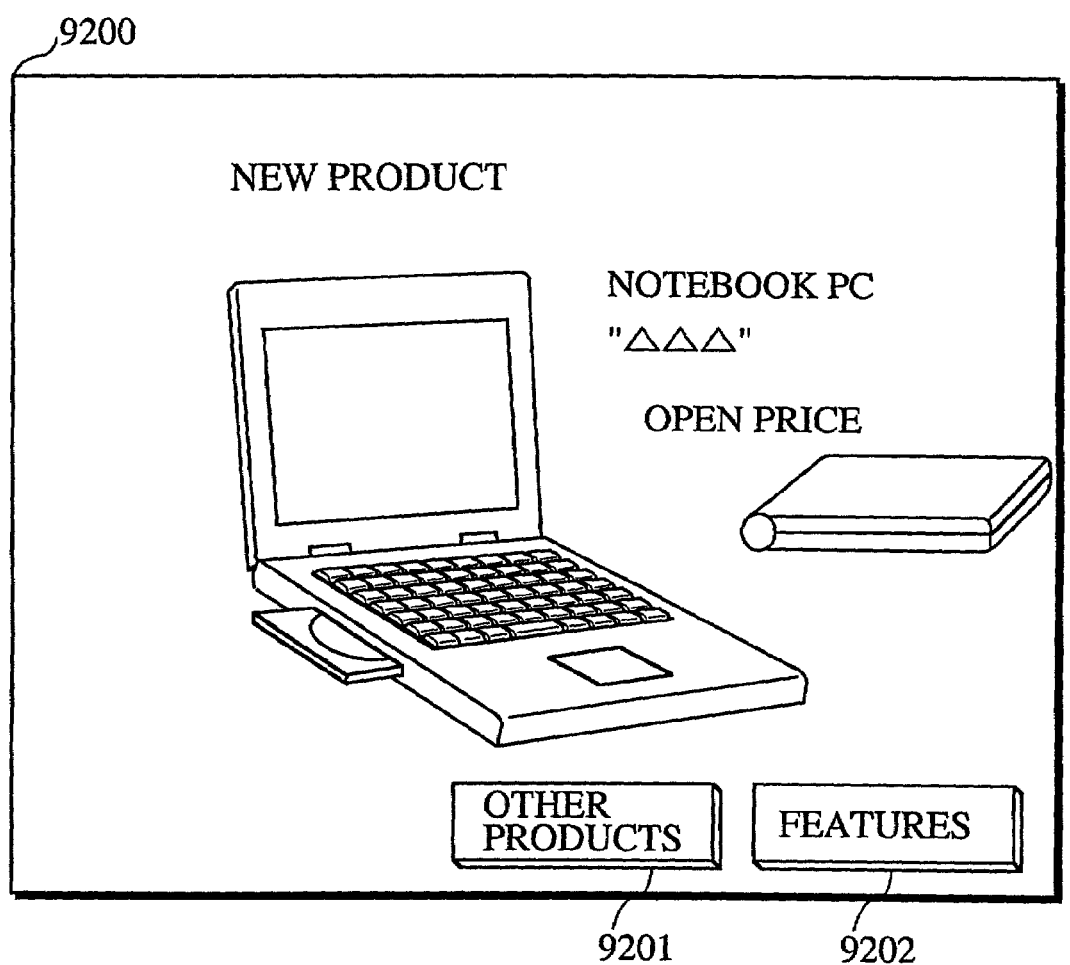
FIG. 2 shows a page frame showing an ad which is attached to the weather information program.

A BML document file 3010 with a filename "A.bml" is a file which defines the page frame of the ad of the company 1 shown in FIG. 2. A BML document file 3020 is a file that defines a page frame which is a link destination of the page frame defined by the BML document file 3010. BML document files 3030 and 3040 are files that define page frames that are link destinations of the page frame defined by the BML document file 3020.

A material file 3095 with a filename "A.jpg" is a file which holds image data of the banner ad of the company A displayed in the banner ad button 9101 in FIG. 1. The image data is shown by a balloon added to the material file 3095 in FIG. 8.

FIG. 9 shows an example of the contents and structure of structure information 3100 held in a structure information file 3090 with a filename "A.acm" in FIG. 8.

According to this structure information 3100, a module with a module name "A" is to contain the contents of seven files with filenames "A.bml", "AS1.jpg", "AS2.jpg", "A1.bml", "A1.png", "A11.bml", and "A12.bml". In other words, the structure information 3100 indicates that the contents of all files shown in FIG. 8 except the structure information file 3090 and the material file 3095 should be contained in one module.

In this embodiment, the content creator always puts the contents of all BML document files and material files into one module, and assigns the same name to (a) a module name of the module which should contain the contents of the BML document files and the material files, (b) part of a filename of a structure information file except an extension, (c) part of a filename of a BML document file defining a link destination page frame of the banner ad except an extension, and (d) part of a filename of a material file showing the display contents of the banner ad except an extension, in the part data generation process. The same name assigned here is hereafter called "part ID".

The following is an explanation of files generated by the authoring device 1100 and stored in the storing unit 1150, when the content creator creates part data for the ad attached to the weather information program by the company B which is another sponsor of the weather information program.

Figure 10:
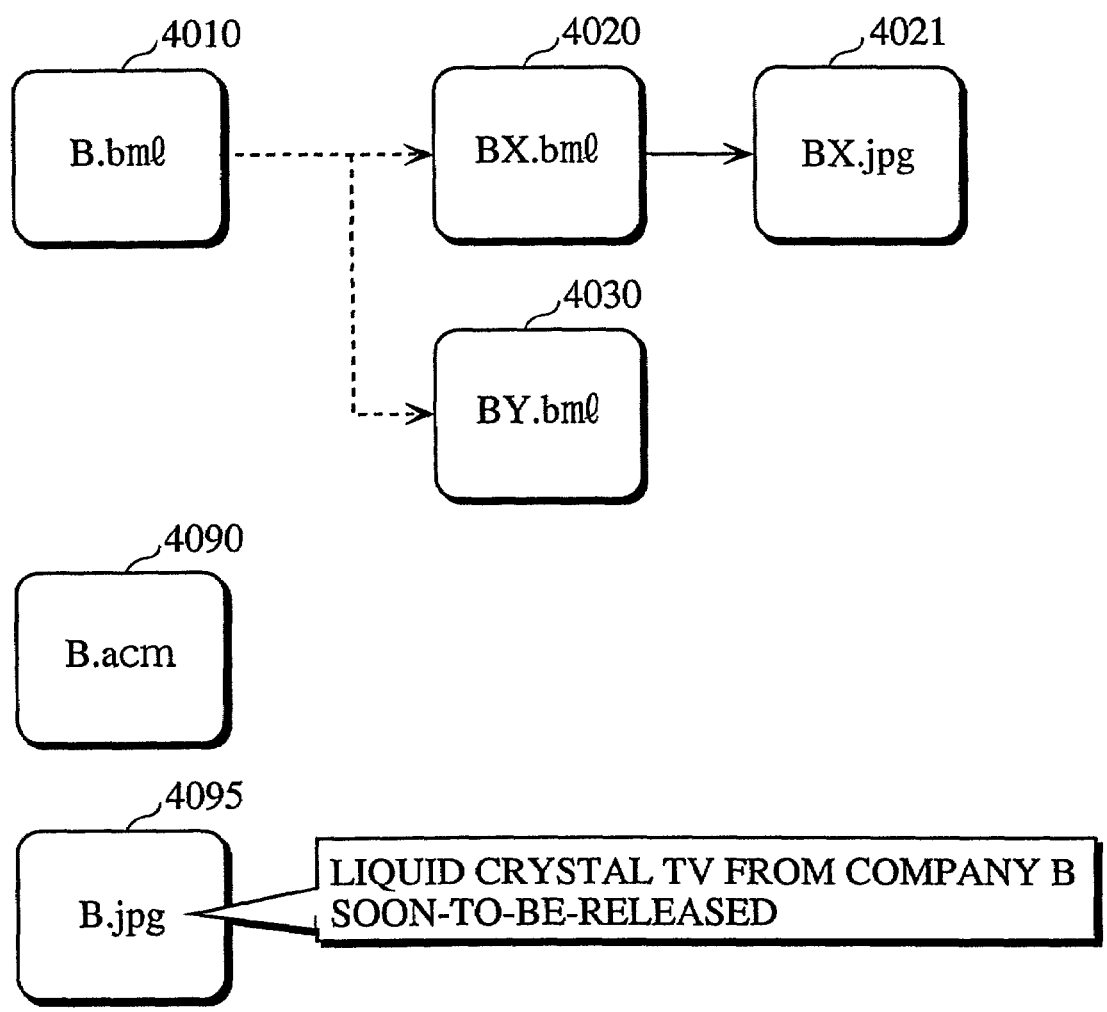
FIG. 10 shows an example of a group of files generated as part data of an ad of a company B to be attached to the weather information program.

FIG. 10 shows an example of a group of files generated as the part data of the ad of the company B which is attached to the weather information program.

In the drawing, the representations of solid arrows and dashed arrows are the same as those in FIG. 5.

A BML document file 4010 with a filename "B.bml" is a file that defines a page frame of the ad of the company B, whereas BML document files 4020 and 4030 are files that define page frames which are link destinations of the page frame defined by the BML document file 4010.

A material file 4095 with a filename "B.jpg" is a file which holds image data of the banner ad of the company B. The image data is shown by a balloon added to the material file 4095 in FIG. 10.

Thus, the three file groups, namely the body data of the weather information program, the part data of the ad of the company A, and the part data of the ad of the company B, are generated by the authoring device 1100 and stored in the storing unit 1150. In addition, a file group of part data of an ad of each of the other sponsors of the weather information program is stored in the storing unit 1150. These file groups in the storing unit 1150 are copied by the copying unit 1205 in the broadcast content generating device 1200, and the copies of the file groups are used for generating the content of the data broadcast, i.e. for generating the modules of the carousel corresponding to each broadcast time slot.

2.3. Schedule Information

The following is an explanation of the schedule information which is inputted by the content creator and stored in the storing unit 1150.

FIG. 11 shows an example of the contents and structure of schedule information 5100.

This schedule information 5100 has a broadcast time slot field 5101 and a part ID field 5102. The broadcast time slot field 5101 shows each broadcast time slot during which the banner ad attached to the weather information program is unchanged. The part ID field 5102 shows a part ID which identifies part data of an ad of a sponsor corresponding to each broadcast time slot, the part ID being used to identify a material file of the display contents of the banner ad displayed during the broadcast time slot and a BML document file of the link destination page frame of the banner ad.

According to the schedule information 5100, the ad of the company A identified by a part ID "A" will be broadcasted from 9:00 to 9:10, the ad of the company B identified by a part ID "B" will be broadcasted from 9:10 to 9:30, and an ad of a bank X identified by a part ID "XBANK" will be broadcasted from 9:30 to 9:45.

3. Operation

An operation of the content generation system 1000 with the above construction is explained below.

Under the control of the content creator, the authoring device 1100 creates the body data of the weather information program and the part data of the ad of each of the sponsors such as the companies A and B, and stores them in the storing unit 1150. Suppose one banner ad is added to the body data of the weather information program, and the files boxed with solid lines in FIGS. 5, 8, and 10 are stored in the storing unit 1150 together with files relating to other part data.

The copying unit 1205 copies each of the files stored in the storing unit 1150. By using these copy files, the broadcast content generating device 1200 determines the contents of each of the modules that constitute the carousel corresponding to each broadcast time slot, in the following manner.

Figure 12:
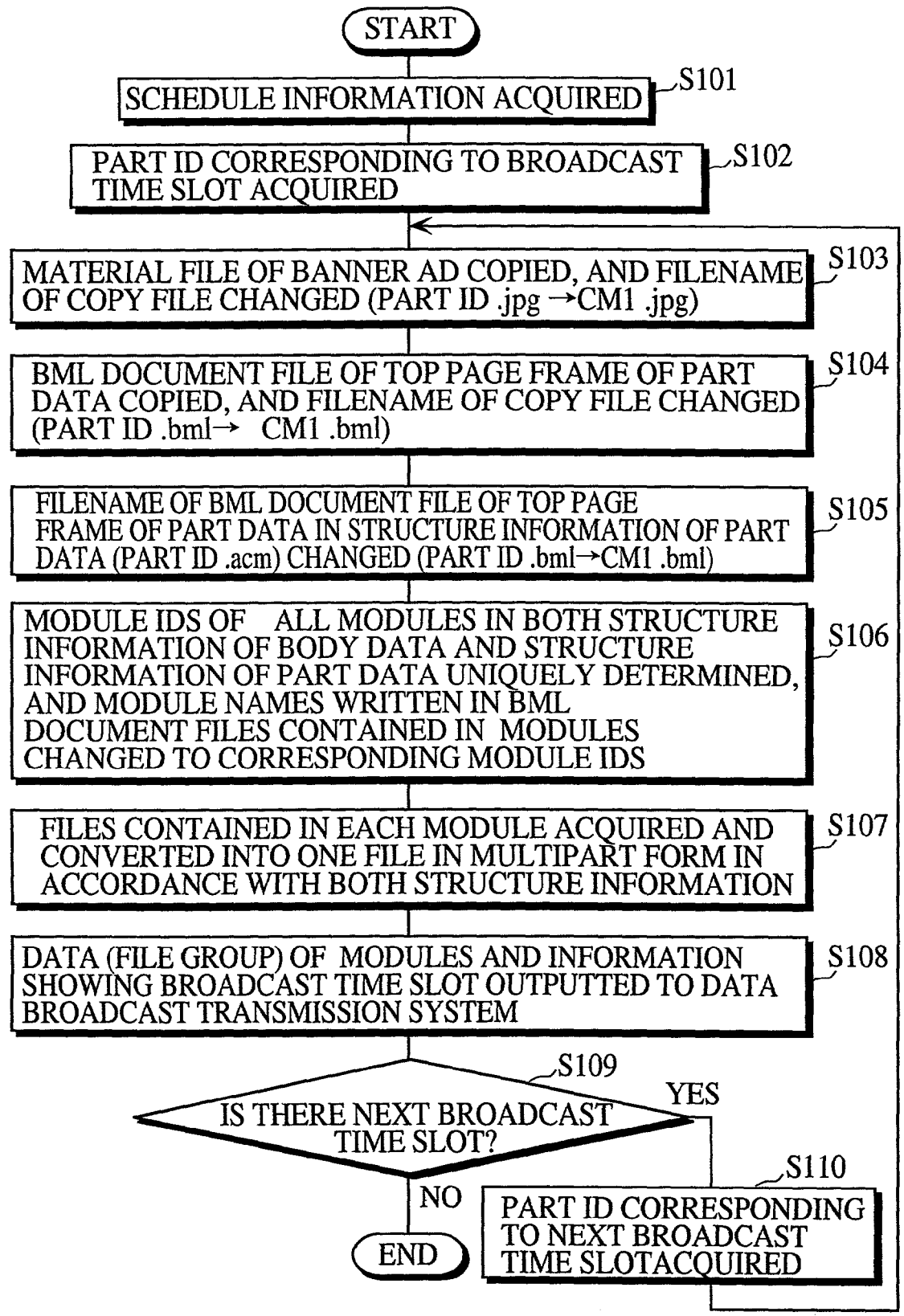
FIG. 12 is a flowchart of an operation of a broadcast content generating device shown in FIG. 4.

FIG. 12 is a flowchart of an operation of the broadcast content generating device 1200.

The controlling unit 1230 controls the schedule information acquiring unit 1240 to acquire the schedule information from the storing unit 1150 (S101). Supposing the schedule information 5100 shown in FIG. 11 is inputted by the content creator, then the schedule information acquiring unit 1240 acquires the schedule information 5100 from the storing unit 1150.

The controlling unit 1230 refers to the schedule information 5100 acquired by the schedule information acquiring unit 1240, and reads a part ID corresponding to a broadcast time slot (S102). Here, the controlling unit 1230 reads the part ID "A1" corresponding to the broadcast time slot "9:00–9:10" at the top of the schedule information 5100.

After this, the controlling unit 1230 instructs the filename changing unit 1250 to copy a file whose filename is a combination of the read part ID and the extension ".jpg" in the storing unit 1150, and change the filename of the copy file to "CM1.jpg" (S103). As a result, the copy of the material file with the filename "A.jpg" which shows the display contents of the banner ad is renamed "CM1.jpg", and stored into the storing unit 1150.

Following this, the controlling unit 1230 instructs the filename changing unit 1250 to copy a file whose filename is a combination of the read part ID and the extension "bml"

in the storing unit 1150, and change the filename of the copy file to "CM1.bml" (S104). As a result, the copy of the BML document file with the filename "A.bml" which defines the link destination page frame of the banner ad, i.e. the top page frame of the part data identified by the part ID "A", is renamed "CM1.bml", and stored into the storing unit 1150.

Following this, the controlling unit 1230 instructs the structure information accessing unit 1220 to read a structure information file whose filename is a combination of the read part ID and the extension "acm", from the storing unit 1150 into a working memory area. The controlling unit 1230 changes the filename of the BML document file of the top page frame of the part data in structure information held in the read structure information file, in the same way as the filename change in step S104. The controlling unit 1230 then instructs the structure information accessing unit 1220 to write the structure information file back into the storing unit 1150 (S105). Which is to say, the controlling unit 1230 changes the filename which combines the read part ID and the extension "bml" in the structure information, to "CM1.bml". As a result, the filename "A.bml" written in the structure information file "A.acm" is changed to "CM1.bml".

After renewing the structure information file of the part data identified by the read part ID, the controlling unit 1230 instructs the structure information accessing unit 1220 to read both of the structure information file of the body data and the structure information file of the part data, from the storing unit 1150 into the working memory area. The controlling unit 1230 regards structure information of both of the structure information files as a single set of structure information, and assigns unique module IDs respectively to all modules with module names shown in the single set of structure information. The controlling unit 1230 then instructs the data file accessing unit 1210 to access all BML document files which are to be contained in these modules in the storing unit 1150, and change each module name which is written in the BML document files to specify a link destination address, to a module ID corresponding to the module name (S106). Here, a module whose module name is "CM1" is assumed to be the same as a module whose module name is the read part ID, and the module name "CM1" of the module in the BML document files is changed to the module ID assigned to the module whose module name is the read part ID.

Suppose the modules with the module names "STARTUP", "CENTER", "WEST", "EAST", "SOUTH", and "A" shown in FIGS. 7 and 9 are respectively assigned module IDs "0", "1", "2", "3", "4", and "5". Then, in the BML document file with the filename "STARTUP.bml" shown in FIG. 6, for example, the description "CENTER/CENTER.bml" is changed to "1/CENTER.bml", and "CM1/CM1.bml" to "5/CM1.bml".

Figure 13:
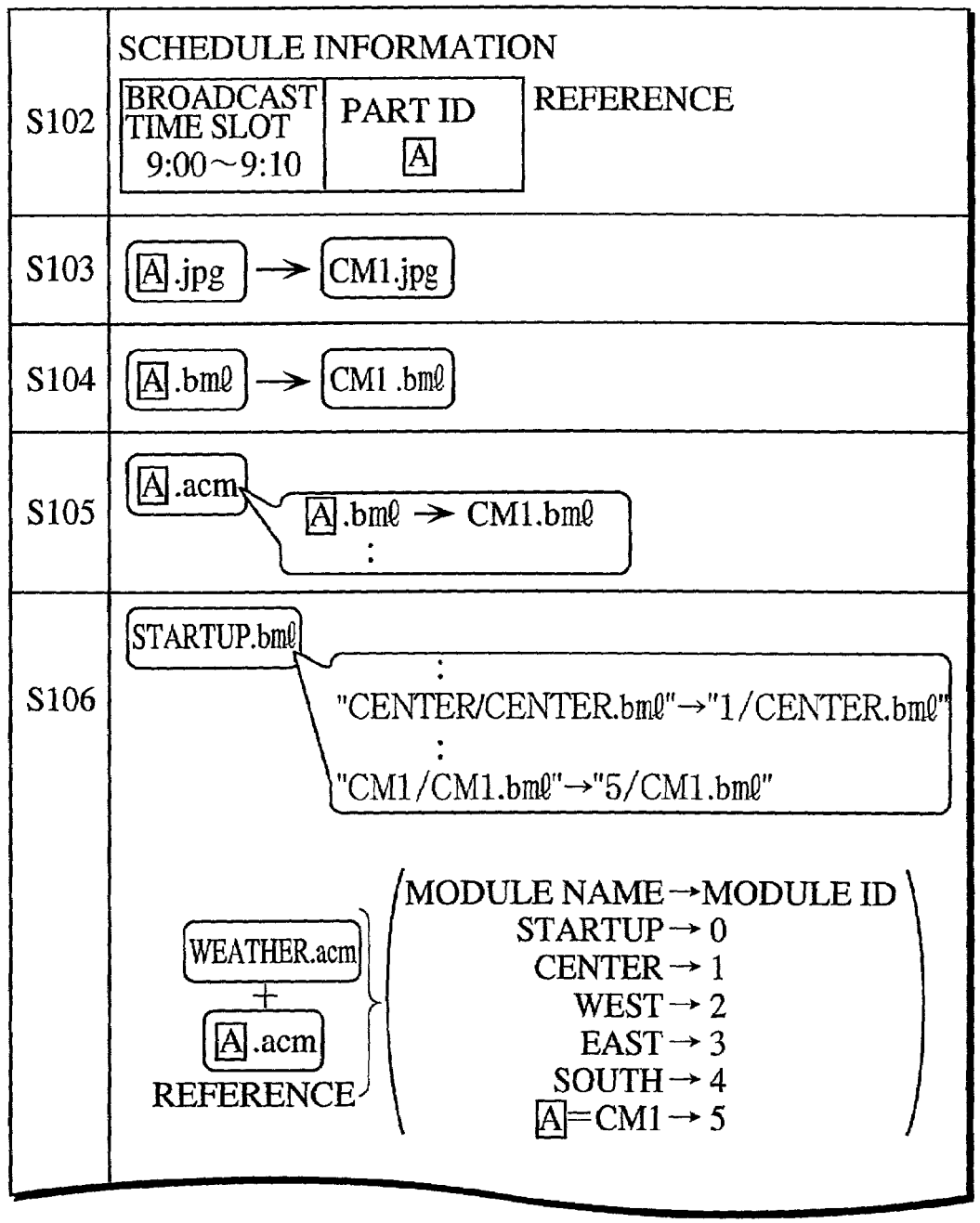
FIG. 13 shows the processing contents of steps S102 to S106 shown in FIG. 12, in a visual form.

FIG. 13 shows the processing contents of steps S102 to S106 in FIG. 12. The file groups obtained as a result of these steps are subjected to multipart conversion in step S107.

After determining the module IDs and renewing the link destination addresses in the BML document files, the controlling unit 1230 instructs the data file accessing unit 1210 to acquire files to be contained in each of the modules from the storing unit 1150, in accordance with the structure information of the body data and the structure information of the part data. The controlling unit 1230 then instructs the module data generating unit 1260 to convert the contents of the acquired files of each of the modules in multipart form into a single file, and store the obtained multipart file corresponding to each of the modules in the working memory area (S107). Here, the module IDs are used as filenames of multipart files corresponding to the modules. For example, a multipart file with a filename "0" holds the contents of the file with the filename "STARTUP.bml", the contents of the file with the filename "MAP.jpg", and the contents of the file with the filename "CM1.jpg".

After this, the controlling unit 1230 instructs the module data generating unit 1260 to output the multipart files corresponding to the modules that form the carousel, to the data broadcast transmission system 1300 together with information showing the broadcast time slot (S108). As a result, data which constitutes each of the modules of the carousel to be transmitted from 9:00 to 9:10 is outputted to the data broadcast transmission system 1300.

Once the data of each of the modules of the carousel to be transmitted during the broadcast time slot has been outputted to the data broadcast transmission system 1300, the controlling unit 1230 refers to the schedule information 5100 to judge whether there is the next broadcast time slot (S109). If there is the next broadcast time slot, the controlling unit 1230 acquires a part ID corresponding to the next broadcast time slot from the schedule information 5100 (S110), and returns to step S103. Otherwise, the controlling unit 1230 ends the operation.

According to the schedule information 5100 in FIG. 11, there is the next broadcast time slot "9:10–9:30". Therefore, the controlling unit 1230 acquires the part ID "B" corresponding to the broadcast time slot "9:10–9:30", and repeats the above operation to generate modules that compose the body data of the weather information program and the part data of the ad of the company B (S103–S108).

Here, the part data of the ad of the company A and the part data of the ad of the company B are both a file group which specifies the display contents of the banner ad button 9101 shown in FIG. 1, the contents of the link destination page frame of the banner ad button 9101, and the contents of the page frames which are linked from the link destination page address. This being so, the part data of the ad of the company B merely takes the place of the part data of the ad of the company A in the carousel of the broadcast time slot from 9:10 to 9:30. In other words, among the modules which constitute the carousel of the broadcast time slot from 9:00 to 9:10, the modules which relate to only the body data, i.e. the modules with the module IDs "1" to "4", are reusable in the carousel of the broadcast time slot from 9:10 to 9:30. Hence the controlling unit 1230 may omit the multipart conversion of step S107 for these reusable modules, and instead use multipart files corresponding to these reusable modules which have already been generated for the carousel of the broadcast time slot 9:00–9:10, in step S108.

Thus, the broadcast content generating device 1200 outputs the multipart files corresponding to the modules of the carousel to be transmitted during each broadcast time slot, to the data broadcast transmission system 1300 together with the information specifying the broadcast time slot (see S108 in FIG. 12). The data broadcast transmission system 1300 encodes the contents of the files corresponding to the modules, and generates a transport stream so that the contents of the files are repeatedly transmitted. The data broadcast transmission system 1300 then multiplexes and converts the transport stream, and broadcasts it during the broadcast time slot.

Figure 14:
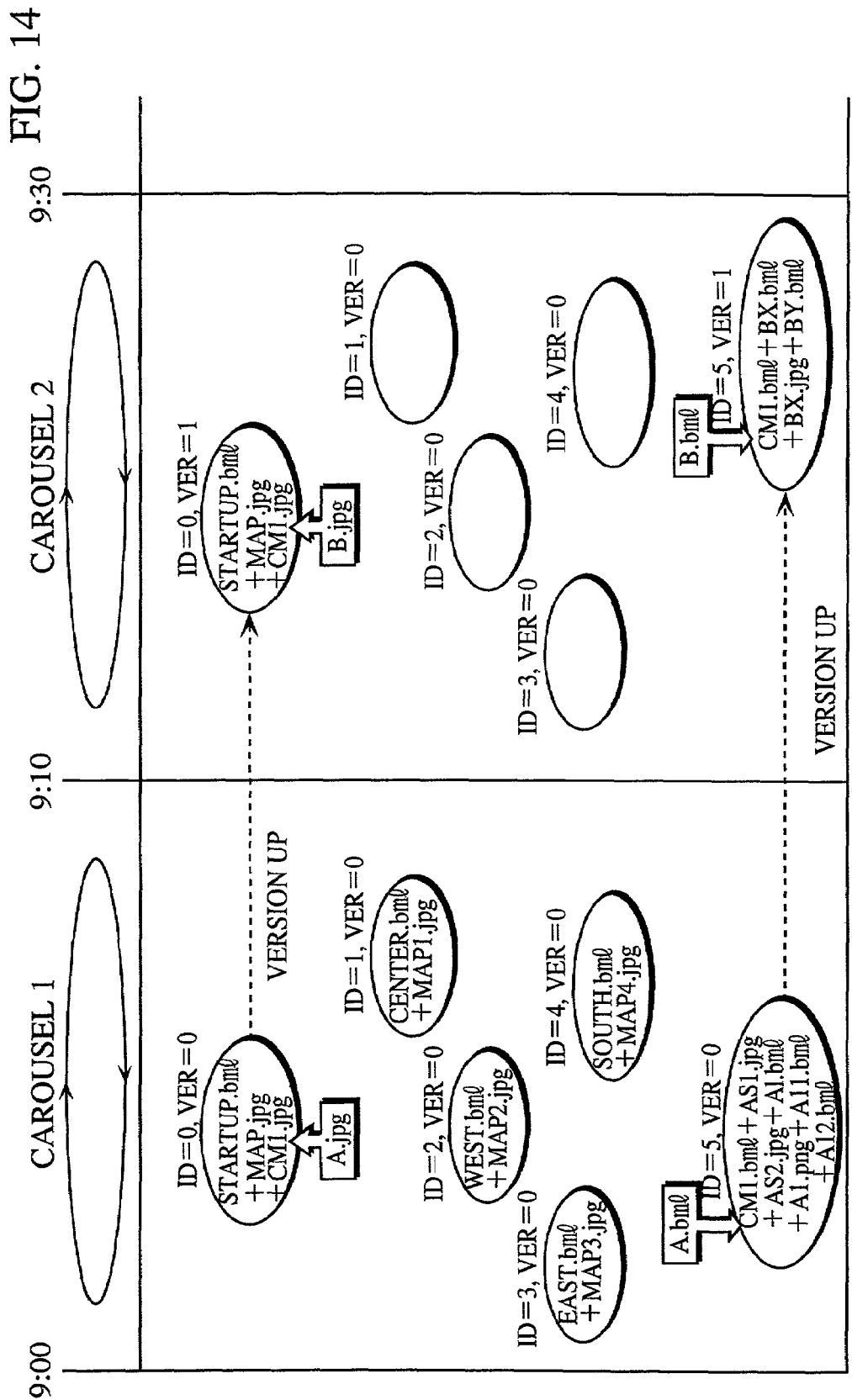
FIG. 14 shows modules that constitute each carousel broadcasted in a different broadcast time slot.

As a result, data such as that shown in FIG. 14 is broadcasted from the data broadcast transmission system 1300.

FIG. 14 shows modules that compose a carousel 1 broadcasted from 9:00 to 9:10, and modules that compose a carousel 2 broadcasted from 9:10 to 9:30.

In the drawing, each module is indicated with an oval, and filenames of files whose contents are contained in the module are shown inside the oval. Also, a module ID and module version of the module are designated respectively as "ID" and "VER", outside the oval. Further, for each of the files "CM1.jpg" and "CM1.bml", its original filename is given outside the oval.

The module version referred to here is assigned to each module by the broadcast content generating device 1200 or the data broadcast transmission system 1300. When a module in one carousel has a different module version with a module of the same module ID in the preceding carousel, it means the contents of the module have changed from the preceding carousel.

As illustrated, the modules with the module IDs "1" to "4" are unchanged in the carousel 1 and the carousel 2, but the modules with the modules IDs "0" and "5" are different in the two carousels.

In the carousel 1, the module with the module ID "0" contains the contents of the material file "CM1.jpg" which is the same as the material file "A.jpg" showing the display contents of the banner ad of the company A, and its module version is "0". In the carousel 2, on the other hand, the module with the module ID "0" contains the contents of the material file "CM1.jpg" which is the same as the material file "B.jpg" showing the display contents of the banner ad of the company B, and its module version is "1", which indicates the change of the contents of the module.

Also, in the carousel 1, the module with the module ID "5" contains the part data of the ad of the company A, and its module version is "0". In the carousel 2, on the other hand, the module with the module ID "5" contains the part data of the ad of the company B, and its module version is "1", which indicates the change of the contents of the module.

The broadcast receiving device 12 identifies each module by its module ID and module version, and extracts and utilizes desired modules.

More specifically, the broadcast receiving device 12 receives the data broadcast from the broadcast transmitting device in the data broadcast transmission system 1300, demultiplexes and extracts the contents of each module, stores them in a storage device such as a memory, and displays desired page frames on the screen according to operations of the user.

For instance, the broadcast receiving device 12 stores the modules of the carousel 1 transmitted from 9:00 to 9:10 into the memory, and displays the page frame including the banner ad of the company A on the screen as shown in FIG. 1. The broadcast receiving device 12 then displays page frames linked from the page frame in FIG. 1, in accordance with operations of the user. After this, the broadcast receiving device 12 receives the modules of the carousel 2 transmitted from 9:10 to 9:30, detects which of the modules of the carousel 2 are different in version with the modules stored in the memory, and replaces the old modules with the new modules in the memory. The broadcast receiving device 12 then displays a page frame including the banner ad of the company B on the screen as shown in FIG. 15, and displays page frames linked from the page frame in FIG. 15 in accordance with operations of the user.

Figure 15:
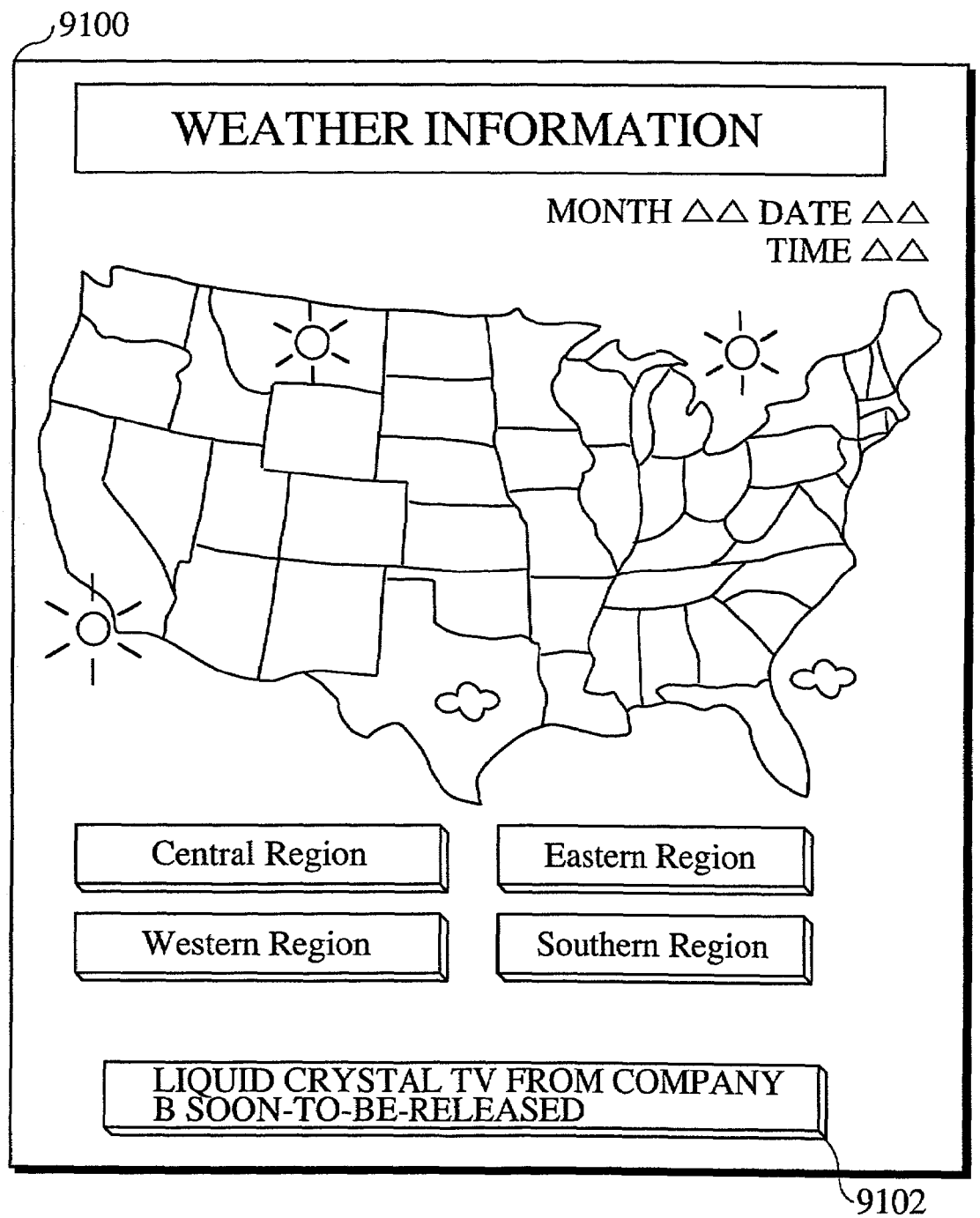
FIG. 15 shows the top page frame of the weather information program after the banner ad has changed from that of the company A shown in FIG. 1 to that of the company B.

FIG. 15 shows the top page frame of the weather information program after the banner ad has changed from that of the company A in FIG. 1 to that of the company B.

4. Supplemental Remarks

Although the data broadcast content generation system of the invention has been explained based on the above embodiment, the invention should not be limited to such. For example, the following modifications are applicable.

(1) The above embodiment describes the case where the BML document files, material files, and structure information files stored in the storing unit 1150 are outputted from the authoring device 1100 as a result that the content creator creates the body data and the part data of each sponsor using the authoring device 1100. However, this is not a limit for the invention. For instance, the body data and the part data of each sponsor may be individually created by a separate authoring device, as long as the BML document files, material files, and structure information files which specify the contents of the data broadcast program are stored in a storing device accessible by the broadcast content generating device 1200.

(2) The above embodiment describes the case where the schedule information shows a part ID corresponding to each broadcast time slot, to identify a group of files which should be linked with the body data. However, the schedule information may instead show any information with which it is possible to identify the group of files to be linked with the body data. More specifically, the above embodiment describes an example when a part ID and specific extensions are used to identify (a) a material file which holds the display contents of the banner ad, (b) a BML document file which defines the top page frame of the ad, and (c) a structure information file which specifies BML document files and material files that are to be contained in one module and used for displaying page frames of the part data of the ad. However, it is essential only that the above three files be identified. Therefore, a filename of the material file of the banner ad, a filename of the BML document file of the top page frame of the ad, and a filename of the structure information file of the part data may be shown in the schedule information instead of the part ID.

(3) The above embodiment describes the case where multipart conversion is performed on the module of the part data of each sponsor in accordance with the structure information of the part data in step S107 in FIG. 12. However, the multipart conversion of the module of the part data may be performed in accordance with the structure information of the part data such as the structure information held in the structure information file "A.acm", after the files are outputted from the authoring device 1100 to the storing unit 1150 but before the files are copied by the copying unit 1205 and the operation shown in FIG. 12 is executed. In such a case, the filename of the BML document file of the top page frame of the ad, such as "A.bml", may be changed to "CM1.bml" prior to the multipart conversion, and a multipart file obtained as a result of the multipart conversion may be given an arbitrary filename such as "A.mlt". In so doing, the multipart file such as "A.mlt" or "B.mlt" can be generated and stored in the storing unit 1150, for the part data of each of the sponsors such as the companies A and B.

When the multipart conversion of the part data is performed by the broadcast content generating device 1200 before the operation of FIG. 12, the part data which should be linked with the body data will end up being composed of only two files that are the material file of the display contents of the banner ad such as "A.jpg" and the multipart file of the module of the part data such as "A.mlt". Accordingly, the schedule information which shows information such as a part ID to identify these two files for each broadcast time slot needs to be stored in the storing unit 1150, before the operation of FIG. 12 is launched by the broadcast content generating device 1200. In this case, steps S104 and S105 in FIG. 12 become unnecessary. Also, in steps S106 and S107, not the structure information of the part data but only the structure information of the body data is referenced, and the module ID following the module IDs assigned to the modules of the body data is set as the module ID of the module of the part data. Alternatively, the filename of the multipart file of the part data with the extension ".mlt" may be associated with the module name of the module of the part data in the structure information of the body data, in advance.

(4) The above embodiment describes the case where one banner ad is attached to the content body, but two or more banner ads may be attached to the content body. In this case, as many part IDs or alternative information as the banner ads need to be included in the schedule information for each broadcast time slot. In accordance with this schedule information, the broadcast content generating device 1200 performs steps S103–S105 for part data corresponding to each of the banner ads. In step S106, the broadcast content generating device 1200 regards the structure information of the body data and the structure information of the part data of each of the banner ads attached to the body data as a single set of structure information, and uniquely determines a module ID of each module shown in the single set of structure information. In step S107, the broadcast content generating device 1200 acquires files to be contained in each module and performs multipart conversion, in accordance with the structure information of the body data and the structure information of the part data of each of the banner ads. Suppose three banner ads are attached to the content body. Then the BML document data of the content body designates the filenames of the material files of the three banner ads as, for example, "CM1.jpg", "CM2.jpg", and "CM3.jpg", and the corresponding link destination addresses as "CM1/CM1.bml", "CM2/CM2.bml", and "CM3/CM3.bml". This being so, the broadcast content generating device 1200 applies the operation of FIG. 12 to the part data of each of the three banner ads, by substituting "CM2" or "CM3" for "CM1" as necessary.

(5) The above embodiment describes the case where the content creator in the body data generation process creates the BML document file which defines the page frame including the banner ad, on the assumption that the display contents of the banner ad are held in the material file with the filename "CM1.jpg", and the link destination page frame of the banner ad is defined by the BML document file with the filename "CM1.bml" in the module with the fixed module name "CM1". Alternatively, when instructed by the content creator to attach a banner ad to a page frame, the authoring device 1100 may automatically insert the statement <A HREF="CM1/CM1.bml""><IMG SRC="CM1.jpg"></A> shown in FIG. 6, into a BML document file defining that page frame.

Also, when receiving an instruction to generate part data from the content creator together with a part ID of the part data, the authoring device 1100 may automatically assign filenames to files such as a structure information file of the part data and a BML document file of the top page frame of the part data, based on the received part ID.

(6) The above embodiment describes the case where the display contents of the banner ad are JPEG image data, but the display contents may be other types of data. Also, the monomedia data mentioned in the above embodiment refers to not only a single type of data but also a combination of two or more types of data such as still image data and audio data.

Also, though the above embodiment presents the specific character strings as the filename extensions, the character strings should not be limited to such, as long as they are predetermined. There is, however, a need to construct the broadcast content generating device 1200 so that the material file of the display contents of the banner ad, the BML document file of the top page frame of the ad, and the structure information file of the part data can be identified from the part ID of the part data and the predetermined filename extensions.

(7) The above embodiment describes the case where the banner ad is attached to the page frame of the content body, but this is not a limit for the invention, which can be applied to any display element attached to a page frame, as long as the display element provides a link to another page frame when selected by the user, and the display contents and link destination of the display element change with broadcast time.

(8) The above embodiment describes the case where the broadcast content generating device 1200 executes the operation of FIG. 12 after the copying unit 1205 copies the files stored in the storing unit 1150, but such copying of the files is not imperative. In the case where the same part data has to be repeatedly used in different broadcast time slots, however, the copying is effective as the original part data can be retained in the storing unit 1150 as it is.

(9) The above embodiment describes the case where the content creator determines the module structure in the body data generation process on the premise that the contents of the material file with the fixed filename "CM1.jpg" showing the display contents of the banner ad are to be contained in the same module as the contents of the BML document file with the fixed filename "STARTUP.bml". Though this has the effect of displaying the top page frame of the content body including the banner ad quickly, the contents of such a material file do not necessarily have to be contained in the same module as the contents of the BML document file.

(10) A computer program for executing the operation of the broadcast content generating device 1200 embodied above (e.g. the operation of FIG. 12) on a general-purpose computer or an apparatus with a program execution function may be distributed via a recording medium or a communication channel.

The recording medium may be an IC card, an optical disk, a flexible disk, a ROM, or the like. The distributed computer program is installed in the personal computer or the apparatus and put to use. The personal computer or the apparatus executes the computer program to realize the functions of the broadcast content generating device 1200 described above.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data broadcast content generation system for generating content that includes a body page and an attached page, comprising:

body data storing means for storing body page data for displaying the body page;

part data storing means for storing a plurality of sets of part data which are each a combination of display element data for determining a display element and attached page data for displaying an attached page;

schedule storing means for storing broadcast schedule information that associates each of a plurality of broadcast time slots with information for identifying a set of part data; and combining means, for each of the plurality of broadcast time slots, for (a) specifying a set of part data associated with the broadcast time slot, in accordance with the broadcast schedule information, (b) relating the body page data, display element data of the specified set of part data, and attached page data of the specified set of part data to each other, so that a display element determined by the display element data will be displayed in the body page, and a link destination of the displayed display element will be an attached page displayed using the attached page data, the attached page being referred to as a link destination attached page, and (c) setting the body page data, the display element data, and the attached page data which are related to each other, as carousel data to be transmitted during the broadcast time slot, wherein the attached page data of each of the plurality of sets of part data includes part document data which is written in a markup language to define the attached page, and a part document file which holds the part document data is stored in the part data storing means together with a display element file which holds the display element data of each of the plurality of sets of part data, the body page data includes body document data which is written in the markup language to define the body page, the body document data including a first filename and a second filename, the first filename being written as a filename for identifying a display element file that determines the display element which will be displayed in the body page and linked to the link destination attached page, and the second filename being written as a filename for identifying a part document file that defines the link destination attached page, and the combining means relates the body page data, the display element data, and the attached page data to each other, by changing a filename of a display element file holding the display element data, to the first filename, and changing a filename of a part document file holding part document data included in the attached page data, to the second filename.

2. The data broadcast content generation system of claim 1, wherein the carousel data is made up of a plurality of modules which should each be generated so as to contain at least one file, the body document data shows the relation between the body page data, the display element data, and the attached page data, using the second filename for identifying the part document file which defines the link destination attached page, and module identification information for identifying a module that is to contain the part document file, the data broadcast content generation system further comprises structure information storing means for storing structure information that shows which file or files are to be contained in each of the plurality of modules, and the combining means (1) determines which file or files, out of a plurality of files that hold the related body page data, display element data, and attached page data, are to be contained in each of the plurality of modules, in accordance with the structure information, (2) assigns a unique module identifier to each of the plurality of modules, and (3) changes the module identification information written in the body document data, to a module identifier assigned to the module that is to contain the part document file which defines the link destination attached page.

3. The data broadcast content generation system of claim 2, wherein the content includes a plurality of body pages which are mutually linked and a plurality of attached pages which are mutually linked, and the combining means relates the body page data, the display element data, and the attached page data to each other, so that the display element determined by the display element data will be displayed in one of the plurality of body pages, and the link destination of the displayed display element will be one of the plurality of attached pages.

4. The data broadcast content generation system of claim 1, wherein the information for identifying the set of part data in the broadcast schedule information is a part identification name expressed by a character string, the display element file that holds the display element data of each of the plurality of sets of part data in the part data storing means has a filename obtained by adding a first predetermined character string to a part identification name of the set of part data, and the part document file that holds the part document data of each of the plurality of sets of part data has a filename obtained by adding a second predetermined character string to a part identification name of the set of part data, and the combining means relates the body page data, the display element data, and the attached page data to each other, by changing a filename of a display element file whose filename is obtained by adding the first predetermined character string to a part identification name of the specified set of part data, to the first filename, and changing a filename of a part document file whose filename is obtained by adding the second predetermined character string to the part identification name of the specified set of part data, to the second filename.

5. A data broadcast content generation system for generating content, that includes a body page and an attached page, comprising:

body data storing means for storing body page data for displaying the body page;

part data storing means for storing a plurality of sets of part data which are each a combination of a set of display element data for determining a display element and a set of attached page data for displaying an attached page;

schedule storing means for storing broadcast schedule information that associates each of a plurality of broadcast time slots with n sets of information for identifying n sets of part data, n being an integer no smaller than 2; and combining means, for each of the plurality of broadcast time slots, for (a) specifying n sets of part data associated with the broadcast time slot, in accordance with the broadcast schedule information, (b) relating the body page data, n sets of display element data of the specified n sets of part data, and n sets of attached page data of the specified n sets of part data to each other, so that n display elements determined by the n sets of display element data will be displayed in the body page, and n link destinations of the displayed n display elements will be n attached pages displayed using the n sets of attached page data, the n attached pages hereinafter being called n link destination attached pages, and (c) setting the body page data, the n sets of display element data, and the n sets of attached page data which are related to each other, as carousel data to be transmitted during the broadcast time slot, wherein the set of attached page data of each of the plurality of sets of part data includes a set of part document data which is written in a markup language to define the attached page, and a part document file which holds the set of part document data is stored in the part data storing means together with a display element file which holds the set of display element data of each of the plurality of sets of part data, the body page data includes body document data which is written in the markup language to define the body page, the body document data includes n display element identification filenames and n part document identification filenames, the n display element identification filenames being written as filenames for identifying n display element files that respectively determine the n display elements which will be displayed in the body page and linked to the n link destination attached pages, and the n part document identification filenames being written as filenames for identifying n part document files that respectively define the n link destination attached pages, and the combining means relates the body page data, the n sets of display element data, and the n sets of attached page data to each other, by changing filenames of n display element files holding the n sets of display element data, respectively to the n display element identification filenames, and filenames of n part document files holding the n sets of part document data included in the n sets of attached page data, respectively to the n part document identification filenames.

6. The data broadcast content generation system of claim 5, wherein each of the n sets of information for identifying the n sets of part data in the broadcast schedule information is a part identification name expressed by a character string, the display element file that holds the set of display element data of each of the plurality of sets of part data stored in the part data storing means has a filename obtained by adding a first predetermined character string to a part identification name of the set of part data, and the part document file that holds the set of part document data of each of the plurality of sets of part data has a filename obtained by adding a second predetermined character string to the part identification name of the set of part data, and the combining means relates the body page data, the n sets of display element data, and the n sets of attached page data to each other, by changing filenames of n display element files whose filenames are obtained by adding the first predetermined character string to part identification names of the specified n sets of part data individually, respectively to the n display element identification filenames, and changing filenames of n part document files whose filenames are obtained by adding the second predetermined character string to the part identification names of the specified n sets of part data individually, respectively to the n part document identification filenames.

7. A data broadcast content generation system for generating content that includes a body page and an attached page, comprising:

body data storing means for storing body page data for displaying the body page;

part data storing means for storing a plurality of sets of part data which are each a combination of display element data for determining a display element and attached page data for displaying an attached page;

schedule storing means for storing broadcast schedule information that associates each of a plurality of broadcast time slots with information for identifying a set of part data; and combining means, for each of the plurality of broadcast time slots, for (a) specifying a set of part data associated with the broadcast time slot, in accordance with the broadcast schedule information, (b) relating the body page data, display element data of the specified set of part data, and attached page data of the specified set of part data to each other, so that a display element determined by the display element data will be displayed in the body page, and a link destination of the displayed display element will be an attached page displayed using the attached page data, the attached page being referred to as a link destination attached page, and (c) setting the body page data, the display element data, and the attached page data which are related to each other, as carousel data to be transmitted during the broadcast time slot, wherein the attached page data of each of the plurality of sets of part data includes part document data which is written in a markup language to define the attached page, and a multipart file obtained by multipart-converting a group of files that hold the attached page data and include a part document file holding the part document data is stored in the part data storing means together with a display element file which holds the display element data of each of the plurality of sets of part data, the body page data includes body document data which is written in the markup language to define the body page, the body document data including a first filename and a second filename, the first filename being written as a filename for identifying a display element file that determines the display element which will be displayed in the body page and linked to the link destination attached page, and the second filename being written as a filename for identifying a part document file that defines the link destination attached page, and the combining means relates the body page data, the display element data, and the attached page data to each other, by changing a filename of a display element file holding the display element data, to the first filename.

8. The data broadcast content generation system of claim 7 further comprising
data generating means for generating the body page data and the attached page data of each of the plurality of sets of part data,
wherein the body data storing means stores the body page data generated by the data generating means, and
the part data storing means stores the attached page data of each of the plurality of sets of part data generated by the data generating means.

9. The data broadcast content generation system of claim 8,
wherein the display element determined by the display element data of each of the plurality of sets of part data is a banner,
the body page data includes body document data that is written in a markup language to define the body page,
the attached page data of each of the plurality of sets of part data includes part document data which is written in the markup language to define the attached page, and a part document file which holds the part document data is stored in the part data storing means together with a display element file which holds the display element data of each of the plurality of sets of part data,
the data generating means, when instructed by a user to add a banner to the body page, adds such a description to the body document data that indicates to display the banner in the body page and includes a first filename and a second filename, the first filename being written as a filename for identifying a display element file which determines the banner, the second filename being written as a filename for identifying a part document file which defines a link destination attached page of the banner, and
the combining means relates the body page data, the display element data, and the attached page data to each other, by changing a filename of a display element file holding the display element data, to the first filename, and changing a filename of a part document file holding part document data included in the attached page data, to the second filename.

10. A data broadcast content generation system for generating content that includes a body page and an attached page, comprising:
body data storing means for storing body page data for displaying the body page;
part data storing means for storing a plurality of sets of part data which are each a combination of display element data for determining a display element and attached page data for displaying an attached page;
schedule storing means for storing broadcast schedule information that associates each of a plurality of broadcast time slots with information for identifying a set of part data; and
combining means, for each of the plurality of broadcast time slots, for
(a) specifying a set of part data associated with the broadcast time slot, in accordance with the broadcast schedule information,
(b) relating the body page data, display element data of the specified set of part data, and attached page data of the specified set of part data to each other, so that a display element determined by the display element data will be displayed in the body page, and a link destination of the displayed display element will be an attached page displayed using the attached page data, the attached page being referred to as a link destination attached page, and
(c) setting the body page data, the display element data, and the attached page data which are related to each other, as carousel data to be transmitted during the broadcast time slot,
data generating means for generating the body page data and the attached page data of each of the plurality of sets of part data,
wherein the body data storing means stores the body page data generated by the data generating means, and
the part data storing means stores the attached page data of each of the plurality of sets of part data generated by the data generating means,
wherein the display element determined by the display element data of each of the plurality of sets of part data is a banner,
the body page data includes body document data that is written in a markup language to define the body page,
the attached page data of each of the plurality of sets of part data includes part document data which is written in the markup language to define the attached page, and a part document file which holds the part document data is stored in the part data storing means together with a display element file which holds the display element data of each of the plurality of sets of part data,
the data generating means, when instructed by a user to add a banner to the body page, adds such a description to the body document data that indicates to display the banner in the body page and includes a first filename and a second filename, the first filename being written as a filename for identifying a display element file which determines the banner, the second filename being written as a filename for identifying a part document file which defines a link destination attached page of the banner, and
the combining means relates the body page data, the display element data, and the attached page data to each other, by changing a filename of a display element file holding the display element data, to the first filename, and changing a filename of a part document file holding part document data included in the attached page data, to the second filename.

11. A data broadcast content generation method for use in a data broadcast content generation device including a storage unit, for generating content that includes a body page and an attached page, the storage unit storing: (1) body page data for displaying the body page; (2) a plurality of sets of part data which are each a combination of display element data for determining a display element and attached page data for displaying an attached page; and (3) broadcast schedule information that associates each of a plurality of broadcast time slots with information for identifying a set of part data, the data broadcast content generation method comprising
a combining step of, for each of the plurality of broadcast time slots,
(a) specifying a set of part data associated with the broadcast time slot, in accordance with the broadcast schedule information,
(b) relating the body page data, display element data of the specified set of part data, and attached page data of the specified set of part data to each other, so that a display element determined by the display element data will be displayed in the body page, and a link destination of the displayed display element will be an attached page displayed using the attached page data, the attached page being referred to as a link destination attached page, and
- (c) setting the body page data, the display element data, and the attached page data which are related to each other, as carousel data to be transmitted during the broadcast time slot, wherein the attached page data of each of the plurality of sets of part data includes part document data which is written in a markup language to define the attached page, and a part document file which holds the part document data is stored in the storage unit together with a display element file which holds the display element data of each of the plurality of sets of part data, the body page data includes body document data which is written in the markup language to define the body page, the body document data including a first filename and a second filename, the first filename being written as a filename for identifying a display element file that determines the display element which will be displayed in the body page and linked to the link destination attached page, and the second filename being written as a filename for identifying a part document file that defines the link destination attached page, and the combining step relates the body page data, the display element data, and the attached page data to each other, by changing a filename of a display element file holding the display element data, to the first filename, and changing a filename of a part document file holding part document data included in the attached page data, to the second filename.

12. A data broadcast content generation method for use in a data broadcast content generation device including a storage unit, for generating content that includes a body page and an attached page, the storage unit storing: (1) body page data for displaying the body page; (2) a plurality of sets of part data which are each a combination of display element data for determining a display element and attached page data for displaying an attached page; and (3) broadcast schedule information that associates each of a plurality of broadcast time slots with information for identifying a set of part data, the data broadcast content generation method comprising a combining step of, for each of the plurality of broadcast time slots,
- (a) specifying a set of part data associated with the broadcast time slot, in accordance with the broadcast schedule information,
- (b) relating the body page data, display element data of the specified set of part data, and attached page data of the specified set of part data to each other, so that a display element determined by the display element data will be displayed in the body page, and a link destination of the displayed display element will be an attached page displayed using the attached page data, the attached page being referred to as a link destination attached page, and
- (c) setting the body page data, the display element data, and the attached page data which are related to each other, as carousel data to be transmitted during the broadcast time slot, wherein the attached page data of each of the plurality of sets of part data includes part document data which is written in a markup language to define the attached page, and a multipart file obtained by multipart-converting a group of files that hold the attached page data and include a part document file holding the part document data is stored in the storage unit together with a display element file which holds the display element data of each of the plurality of sets of part data, the body page data includes body document data which is written in the markup language to define the body page, the body document data including a first filename and a second filename, the first filename being written as a filename for identifying a display element file that determines the display element which will be displayed in the body page and linked to the link destination attached page, and the second filename being written as a filename for identifying a part document file that defines the link destination attached page, and the combining step relates the body page data, the display element data, and the attached page data to each other, by changing a filename of a display element file holding the display element data, to the first filename.

13. A computer program embodied on a computer readable medium for use with a computer including a storage unit, for generating content including a body page and an attached page, the storage unit storing: (1) body page data for displaying the body page; (2) a plurality of sets of part data which are each a combination of display element data for determining a display element and attached page data for displaying an attached page; and (3) broadcast schedule information that associates each of a plurality of broadcast time slots with information for identifying a set of part data, the computer program comprising a computer readable program code for, for each of the plurality of broadcast time slots,
- (a) specifying a set of part data associated with the broadcast time slot, ill accordance with the broadcast schedule information,
- (b) relating the body page data, display element data of the specified set of part data, and attached page data of the specified set of part data to each other, so that a display element determined by the display element data will be displayed in the body page, and a link destination of the displayed display element will be an attached page displayed using the attached page data, the attached page being referred to as a link destination attached page, and
- (c) setting the body page data, the display element data, and the attached page data which are related to each other, as carousel data to be transmitted during the broadcast time slot, wherein the attached page data of each of the plurality of sets of part data includes part document data which is written in a markup language to define the attached page, and a part document file which holds the part document data is stored in the storage unit together with a display element file which holds the display element data of each of the plurality of sets of part data, the body page data includes body document data which is written in the markup language to define the body page, the body document data including a first filename and a second filename, the first filename being written as a filename for identifying a display element file that determines the display element which will be displayed in the body page and linked to the link destination attached page, and the second filename being written as a filename for identifying a part document file that defines the link destination attached page, and the computer readable program code relates the body page data, the display element data, and the attached page data to each other, by changing a filename of a display element file holding the display element data, to the first filename, and changing a filename of a part document file holding part document data included in the attached page data, to the second filename.

14. A computer program embodied on a computer readable medium for use with a computer including a storage unit, for generating content including a body page and an attached page, the storage unit storing: (1) body page data for displaying the body page; (2) a plurality of sets of part data which are each a combination of display element data for determining a display element and attached page data for displaying an attached page; and (3) broadcast schedule information that associates each of a plurality of broadcast time slots with information for identifying a set of part data, the computer program comprising
   a computer readable program code for, for each of the plurality of broadcast time slots,
   (a) specifying a set of part data associated with the broadcast time slot, in accordance with the broadcast schedule information,
   (b) relating the body page data, display element data of the specified set of part data, and attached page data of the specified set of part data to each other, so that a display element determined by the display element data will be displayed in the body page, and a link destination of the displayed display element will be an attached page displayed using the attached page data, the attached page being referred to as a link destination attached page, and
   (c) setting the body page data, the display element data, and the attached page data which are related to each other, as carousel data to be transmitted during the broadcast time slot,
wherein the attached page data of each of the plurality of sets of part data includes part document data which is written in a markup language to define the attached page, and a multipart file obtained by multipart-converting a group of files that hold the attached page data and include a part document file holding the part document data is stored in the storage unit together with a display element file which holds the display element data of each of the plurality of sets of part data,
the body page data includes body document data which is written in the markup language to define the body page, the body document data including a first filename and a second filename, the first filename being written as a filename for identifying a display element file that determines the display element which will be displayed in the body page and linked to the link destination attached page, and the second filename being written as a filename for identifying a part document file that defines the link destination attached page, and
the computer readable program code relates the body page data, the display element data, and the attached page data to each other, by changing a filename of a display element file holding the display element data, to the first filename.

* * * * *

UNITED STATES PATENT AND TRADEMARK OFFICE
CERTIFICATE OF CORRECTION

PATENT NO. : 6,983,482 B2  
DATED : January 3, 2006  
INVENTOR(S) : Morita et al.

It is certified that error appears in the above-identified patent and that said Letters Patent is hereby corrected as shown below:

Column 28,
Line 34, delete "ill" and replace it with -- in --.

Signed and Sealed this

Eleventh Day of April, 2006

JON W. DUDAS  
*Director of the United States Patent and Trademark Office*